US012786175B2

(12) United States Patent
Dai et al.

(10) Patent No.: US 12,786,175 B2
(45) Date of Patent: Nov. 3, 2026

(54) METHOD FOR ENCRYPTING UPGRADE DATA PACKET, METHOD FOR DECRYPTING UPGRADE DATA PACKET, METHOD FOR UPGRADING FIRMWARE, ELECTRONIC DEVICE AND STORAGE MEDIUM

(71) Applicant: SANSURE BIOTECH INC., Changsha (CN)

(72) Inventors: Lizhong Dai, Changsha (CN); Yaping Xie, Changsha (CN); Zhenfan Cui, Changsha (CN); Jiangang Ling, Changsha (CN)

(73) Assignee: SANSURE BIOTECH INC., Changsha (CN)

( * ) Notice: Subject to any disclaimer, the term of this patent is extended or adjusted under 35 U.S.C. 154(b) by 9 days.

(21) Appl. No.: 19/191,225

(22) Filed: Apr. 28, 2025

(65) Prior Publication Data

US 2025/0260675 A1 Aug. 14, 2025

Related U.S. Application Data

(63) Continuation of application No. PCT/CN2024/081825, filed on Mar. 15, 2024.

(30) Foreign Application Priority Data

Aug. 28, 2023 (CN) ......................... 202311088944.4

(51) Int. Cl.
*H04L 9/40* (2022.01)
*G06F 8/65* (2018.01)

(52) U.S. Cl.
CPC ............ *H04L 63/0428* (2013.01); *G06F 8/65* (2013.01)

(58) Field of Classification Search
CPC ..... H04L 63/0428; G06F 8/65; G06F 21/572; G06F 21/602; G06F 21/60; G06F 8/654
(Continued)

(56) References Cited

U.S. PATENT DOCUMENTS

| | | | | |
|---|---|---|---|---|
| 8,233,624 B2 * | 7/2012 | Ollikainen | H04L 63/08 713/193 |
| 9,742,742 B1 * | 8/2017 | Monk | H04L 9/3263 |

(Continued)

FOREIGN PATENT DOCUMENTS

| | | |
|---|---|---|
| CN | 110896387 A | 3/2020 |
| CN | 115208701 A | 10/2022 |

(Continued)

OTHER PUBLICATIONS

European Search Report issued in counterpart European Patent Application No. EP 24857705.8, dated Jan. 29, 2026.

(Continued)

*Primary Examiner* — Badri Narayanan Champakesan
(74) *Attorney, Agent, or Firm* — Westbridge IP LLC

(57) ABSTRACT

A method for encrypting an upgrade data packet includes: splitting, based on a preset packet length, an upgrade data packet to obtain a plurality of data packets; individually encrypting each of the plurality of data packets to obtain a plurality of individually encrypted data packets; generating an overall data packet based on the plurality of individually encrypted data packets; and performing an overall encryption on the overall data packet to obtain an overall encrypted data packet. During a firmware upgrade process, the upgrade data packet is first split, then each of the plurality of data packets is individually encrypted, and finally, the overall encryption is performed on the overall data packet generated based on the plurality of individually encrypted data pack-
(Continued)

ets, thereby effectively ensuring security of an upgrade file throughout a firmware upgrade process.

19 Claims, 7 Drawing Sheets

(58) Field of Classification Search
USPC .......................................................... 713/160
See application file for complete search history.

(56) References Cited

U.S. PATENT DOCUMENTS

| | | | | |
|---|---|---|---|---|
| 10,719,620 | B1 * | 7/2020 | Medina, III | G06F 21/602 |
| 2008/0037420 | A1 * | 2/2008 | Tang | H04L 69/163 370/231 |
| 2009/0169000 | A1 * | 7/2009 | Shintani | H04N 21/23897 713/189 |
| 2012/0290842 | A1 * | 11/2012 | Artishdad | H04L 63/123 713/168 |
| 2013/0322628 | A1 * | 12/2013 | Rhyu | H04N 21/2347 380/255 |
| 2018/0219842 | A1 * | 8/2018 | Bellala | H04L 67/12 |
| 2019/0058693 | A1 * | 2/2019 | Alkhabbaz | H04L 63/14 |
| 2019/0132296 | A1 * | 5/2019 | Jiang | H04L 69/324 |

FOREIGN PATENT DOCUMENTS

| | | | |
|---|---|---|---|
| CN | 115543386 | A | 12/2022 |
| CN | 115543390 | A | 12/2022 |
| CN | 116506848 | A | 7/2023 |

OTHER PUBLICATIONS

International Search Report and Written Opinion issued in corresponding PCT Application No. PCT/CN2024/081825, dated Jun. 18, 2024.

* cited by examiner

METHOD FOR ENCRYPTING UPGRADE DATA PACKET, METHOD FOR DECRYPTING UPGRADE DATA PACKET, METHOD FOR UPGRADING FIRMWARE, ELECTRONIC DEVICE AND STORAGE MEDIUM

CROSS-REFERENCE TO RELATED APPLICATIONS

This application is a continuation of International Application No. PCT/CN2024/081825, filed on Mar. 15, 2024, which claims priority to Chinese Patent Application No. 202311088944.4 filed on Aug. 28, 2023. The disclosures of the aforementioned applications are hereby incorporated by reference in their entireties.

TECHNICAL FIELD

The present disclosure relates to the field of firmware upgrade technologies, and in particular, to a method for encrypting an upgrade data packet, a method for decrypting an upgrade data packet, a method for upgrading firmware, an electronic device and a storage medium.

BACKGROUND

Firmware refers to software embedded in a hardware device, and firmware upgrade refers to a process of updating or upgrading firmware in a device or a system. During a firmware upgrade process, transmission or storage of an upgrade file is involved. However, the upgrade file may contain sensitive code, configuration information, or user data. The upgrade file may be stolen, tampered with or maliciously used by unauthorized personnel when being transmitted or stored, thereby failing to ensure security of an upgrade file throughout a firmware upgrade process.

SUMMARY

Purposes of the present disclosure are to provide a method for encrypting an upgrade data packet, a method for decrypting an upgrade data packet, a method for upgrading firmware, an electronic device and a storage medium, so as to effectively ensure security of an upgrade file throughout a firmware upgrade process.

In order to achieve the above purposes, according to a first aspect, embodiments of the present disclosure provide a method for encrypting an upgrade data packet, which is applied to an encryption device, and the method for encrypting the upgrade data packet includes: splitting, based on a preset packet length, an upgrade data packet to obtain a plurality of data packets; individually encrypting each of the plurality of data packets to obtain a plurality of individually encrypted data packets; generating an overall data packet based on the plurality of individually encrypted data packets; and performing an overall encryption on the overall data packet to obtain an overall encrypted data packet.

According to a second aspect, embodiments of the present disclosure provide a method for decrypting an upgrade data packet, which is applied to an upgrade control device, and the method for decrypting the upgrade data packet includes: performing an overall decryption on an overall encrypted data packet to obtain an overall data packet; splitting, based on a preset packet length, the overall data packet to obtain a plurality of individually encrypted data packets; and transmitting at least one of the plurality of individually encrypted data packets to a to-be-upgraded device.

According to a third aspect, embodiments of the present disclosure provide a method for decrypting an upgrade data packet, which is applied to a to-be-upgraded device, and the method for decrypting the upgrade data packet includes: receiving at least one individually encrypted data packet transmitted by an upgrade control device; and individually decrypting each of the at least one individually encrypted data packet to obtain at least one data packet.

According to a fourth aspect, embodiments of the present disclosure provide a method for upgrading firmware, which is applied to a to-be-upgraded device, and the method for upgrading the firmware includes: performing the method for decrypting the upgrade data packet according to the third aspect to obtain the at least one data packet; and upgrading firmware based on the at least one data packet.

According to a fifth aspect, embodiments of the present disclosure provide an electronic device, which includes a memory and a processor, executable code is stored in the memory, and the processor is configured to execute the executable code to implement the method according to any one of the first aspect to the fourth aspect.

According to a sixth aspect, embodiments of the present disclosure provide a non-transitory computer-readable storage medium, the non-transitory computer-readable storage medium stores a computer program, and the computer program is configured to perform the method according to any one of the first aspect to the fourth aspect.

According to above technical solutions, during a firmware upgrade process, the upgrade data packet is first split into the plurality of data packets, then each of the plurality of data packets is individually encrypted to obtain the plurality of individually encrypted data packets, and finally, the overall encryption is performed on the overall data packet generated based on the plurality of individually encrypted data packets, thereby effectively ensuring security of an upgrade file throughout a firmware upgrade process.

BRIEF DESCRIPTION OF THE DRAWINGS

The accompanying drawings are used to provide a further understanding of embodiments of the present disclosure, and constitute a part of the specification. Together with the following specific implementations, the accompanying drawings serve to explain the embodiments of the present disclosure, but do not constitute a limitation on the embodiments of the present disclosure.

DETAILED DESCRIPTION OF THE EMBODIMENTS

Specific implementations of the embodiments of the present disclosure are described in detail below with reference to the accompanying drawings. It should be understood that the specific implementations described herein are only used to describe and explain the embodiments of the present disclosure, and are not intended to limit the embodiments of the present disclosure.

In firmware upgrade, an upgrade file may be transmitted or stored via a storage medium such as a USB flash disk or a wireless network. For example, a device or a system may obtain updated firmware or software via a storage medium such as a USB flash disk. For another example, a device or a system may directly download and install updated firmware or software from a remote server via a wireless network.

An upgrade file may contain sensitive code, configuration information, or user data. If such data remains unencrypted during transmission or storage, the data may be stolen, tampered with or maliciously used by unauthorized personnel. Therefore, an encryption method is urgently needed to ensure security of an upgrade file throughout a firmware upgrade process.

Figure 1:
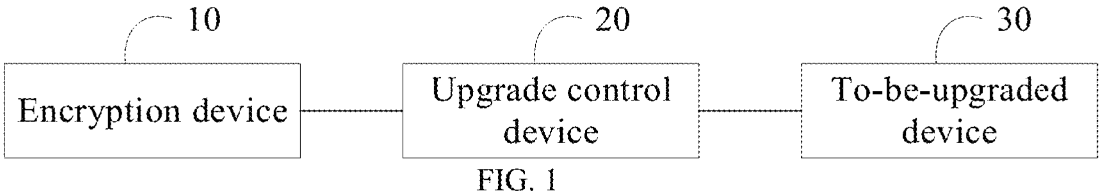
FIG. 1 is an example diagram of a system framework according to an embodiment of the present disclosure.

The following describes in detail, with reference to FIG. 1, a system architecture of an application scenario for each method mentioned in the embodiments of the present disclosure. As shown in FIG. 1, the application scenario provided in the embodiments of the present disclosure involves an encryption device 10, an upgrade control device 20, and a to-be-upgraded device 30, the encryption device 10 is connected to the upgrade control device 20, and the upgrade control device 20 is connected to the to-be-upgraded device 30.

In an embodiment, the encryption device 10 is in communication connection with the upgrade control device 20, and the upgrade control device 20 is in communication connection with the to-be-upgraded device 30. That is, the encryption device 10 and the upgrade control device 20 may be connected via wired or wireless means, such as a cable or Wi-Fi. Similarly, the upgrade control device 20 and the to-be-upgraded device 30 may be connected via wired or wireless means, such as a cable or Wi-Fi.

In an embodiment, the encryption device 10 may be any device capable of an encryption function, such as an encryption server, an encryption chip, an encryption module, or encryption hardware; the upgrade control device 20 may be any device capable of a decryption function and controlling a upgrade process, such as an upgrade server, a device equipped with an upgrade tool or upgrade management software; and the to-be-upgraded device 30 may be any device requiring firmware or software upgrade, such as a smart instrumentation device, an internal component of an instrument, or a local area network device.

It should be understood that the upgrade control device 20 is not limited to hardware and may also be a platform built using a server, and the platform may be a to-be-upgraded platform or a network central control platform.

The encryption device 10 is configured to execute a method for encrypting an upgrade data packet. For example, the encrypting method includes: splitting, based on a preset packet length, an upgrade data packet to obtain a plurality of data packets; individually encrypting each of the plurality of data packets to obtain a plurality of individually encrypted data packets; generating an overall data packet based on the plurality of individually encrypted data packets; and performing an overall encryption on the overall data packet to obtain an overall encrypted data packet.

The upgrade control device 20 is configured to execute a first method for decrypting an upgrade data packet. For example, the first decrypting method includes: performing an overall decryption on an overall encrypted data packet to obtain an overall data packet; splitting, based on a preset packet length, the overall data packet to obtain a plurality of individually encrypted data packets; and transmitting at least one of the plurality of individually encrypted data packets to a to-be-upgraded device.

The to-be-upgraded device 30 is configured to execute a second method for decrypting an upgrade data packet and a method for upgrading firmware. For example, the second decrypting method includes: receiving at least one individually encrypted data packet transmitted by an upgrade control device; and individually decrypting each of the at least one individually encrypted data packet to obtain at least one data packet. For example, the upgrading method includes: performing the second decrypting method to obtain at least one data packet; and upgrading firmware based on the at least one data packet.

In a specific firmware upgrade scenario of this embodiment, the firmware may be upgraded by means of Over-The-Air Technology (OTA) upgrade, Universal Serial Bus (USB) upgrade, storage medium (such as a USB flash disk) upgrade, Universal Asynchronous Receiver/Transmitter (UART) upgrade, or the like.

Figure 2A:
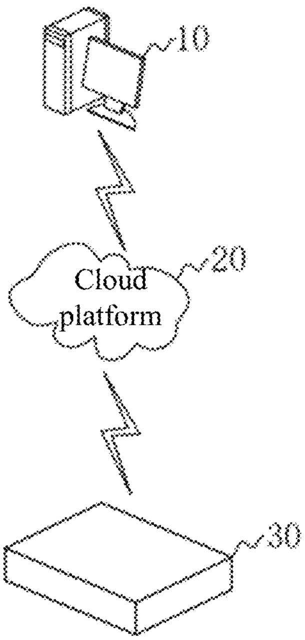
FIG. 2*a* is an architecture diagram of a wireless upgrade system according to an embodiment of the present disclosure.

With reference to FIG. 2*a*, in a first embodiment, the firmware is upgraded by means of the OTA upgrade, and the OTA upgrade is a technology for upgrading firmware or software via a wireless network, which involves transmitting an upgrade data packet from a cloud server to a remote device, thereby enabling updating of firmware or software of a device. If the firmware is upgraded by means of the OTA upgrade, the upgrade control device 20 may be a cloud platform, that is, an overall decryption is performed using the cloud platform, and an individual decryption is performed using the to-be-upgraded device 30. The encryption device 10 is connected to the upgrade control device 20 via wireless means, such as Wi-Fi or a cellular network, and the upgrade control device 20 is connected to the to-be-upgraded device 30 via wireless means, such as Wi-Fi or a cellular network.

Figure 2B:
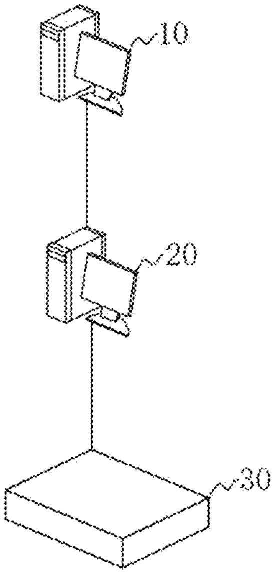
FIG. 2*b* is an architecture diagram of a wired upgrade system according to an embodiment of the present disclosure.

Referring to FIG. 2*b*, in a second embodiment, in a scenario in which the firmware is upgraded by means of the USB upgrade or the UART upgrade, the upgrade control device 20 is in wired connection with both the encryption device 10 and the to-be-upgraded device 30.

The USB upgrade refers to a process of connecting the to-be-upgraded device 30 via a USB interface, and upgrading firmware or software using a special upgrade tool or software. The upgrade control device 20 may be a computer, the upgrade control device 20 is in wired connection with the encryption device 10 through a USB cable, and the upgrade control device 20 is in wired connection with the to-be-upgraded device 30 through a USB cable.

The UART upgrade refers to a process of connecting the to-be-upgraded device 30 via a serial port, and upgrading firmware or software using a special upgrade tool or software. The upgrade control device 20 may be a computer, the upgrade control device 20 is in wired connection with the encryption device 10 through a serial port cable, and the upgrade control device 20 is in wired connection with the to-be-upgraded device 30 through a serial port cable.

In a third embodiment, the firmware may also be upgraded using a storage medium such as a USB flash disk, that is, the to-be-upgraded device 30 is upgraded using an upgrade program or software in the storage medium.

It should be noted that connection between the encryption device 10 and the upgrade control device 20 and connection between the to-be-upgraded device 30 and the upgrade control device 20 are not limited to the foregoing three embodiments. That is, the connection between the encryption device 10 and the upgrade control device 20 may be wireless connection or wired connection, and similarly, the connection between the to-be-upgraded device 30 and the upgrade control device 20 may be wireless connection or wired connection, which is not limited herein.

In the system provided in the embodiments of the present disclosure, communication between the encryption device 10 and the upgrade control device 20, and between the upgrade control device 20 and the to-be-upgraded device 30 enables encryption and decryption of an upgrade data packet during a firmware upgrade process, thereby effectively ensuring security of an upgrade file throughout a firmware upgrade process.

The methods mentioned in the embodiments of the present disclosure in FIG. 3 to FIG. 9 are described in detail below with reference to FIG. 1.

Figure 3:
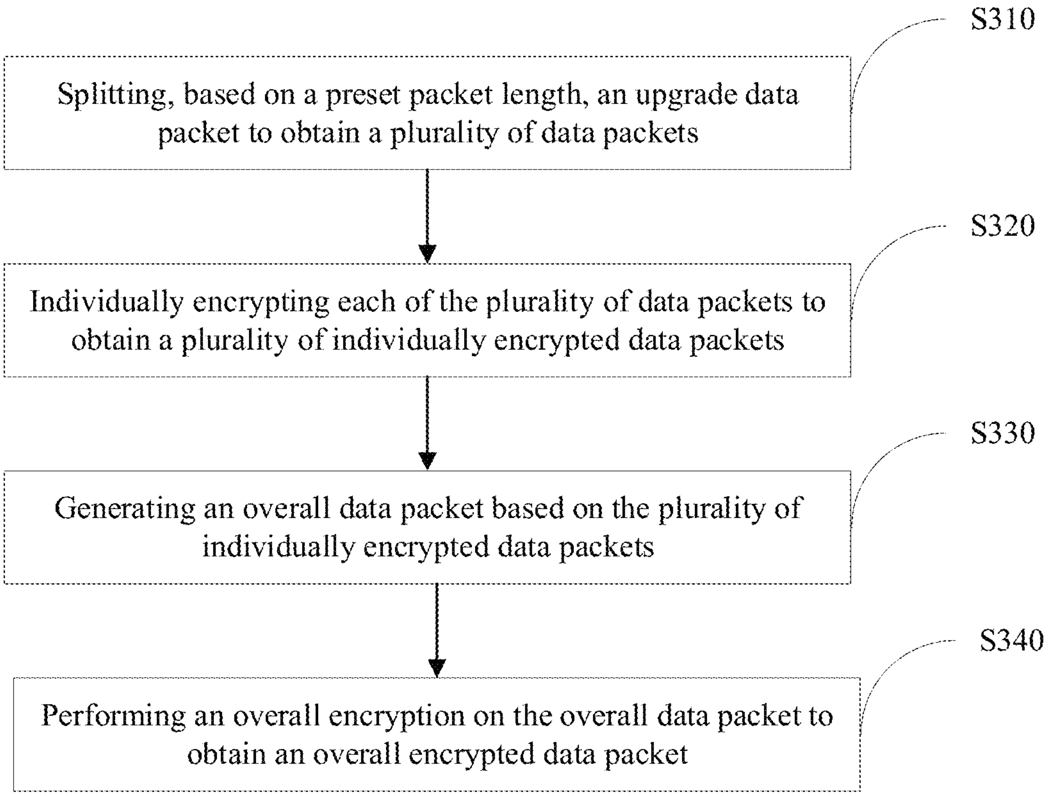
FIG. 3 is an overall flowchart of a method for encrypting an upgrade data packet according to an embodiment of the present disclosure.

FIG. 3 is an overall flowchart of a method for encrypting an upgrade data packet according to an embodiment of the present disclosure. The method for encrypting the upgrade data packet in FIG. 3 is executed by the encryption device 10 mentioned in FIG. 1. As shown in FIG. 3, the method includes the following steps.

S310: Splitting, based on a preset packet length, an upgrade data packet to obtain a plurality of data packets.

Before splitting the upgrade data packet, the encryption device 10 may obtain the upgrade data packet.

The upgrade data packet refers to a data set of a new version or a patch of software or a system, and usually includes a modified program file, a configuration file, a library file, or the like. In this embodiment, the upgrade data packet is used to upgrade the to-be-upgraded device 30 mentioned in FIG. 1.

The preset packet length refers to a fixed length predetermined for each data packet during splitting of an upgrade data packet. After the upgrade data packet is obtained, the upgrade data packet is split into the plurality of data packets based on the preset packet length. Lengths of the data packets may be consistent or inconsistent, which is not specifically limited by the embodiments of the present disclosure.

S320: Individually encrypting each of the plurality of data packets to obtain a plurality of individually encrypted data packets.

The encryption device 10 adopts an encryption algorithm to individually encrypt each split data packet. In this embodiment, the encryption algorithm is an AES-128 encryption algorithm. AES stands for Advanced Encryption Standard, which commonly has three variants: AES-128, AES-192 and AES-256. A difference among the AES-128, the AES-192 and the AES-256 is that key lengths are different, a key length of the AES-128 is 16 bytes, a key length of the AES-192 is 24 bytes, and a key length of the AES-256 is 32 bytes. The longer the key, the higher the security strength. In this embodiment, the AES-128 encryption algorithm is adopted. In addition, other encryption algorithms may also be used, which is not described in detail herein.

S330: Generating an overall data packet based on the plurality of individually encrypted data packets.

The encryption device 10 merges the plurality of individually encrypted data packets into the overall data packet. After each data packet is individually encrypted, all the individually encrypted data packets may be merged into the overall data packet, or some of the individually encrypted data packets may be merged into the overall data packet. For example, after each data packet is individually encrypted, ten individually encrypted data packets are obtained, and then the ten individually encrypted data packets may be merged into the overall data packet, or six individually encrypted data packets may be merged into the overall data packet.

S340: Performing an overall encryption on the overall data packet to obtain an overall encrypted data packet.

The encryption device 10 adopts an encryption algorithm to perform the overall encryption on the overall data packet to obtain the overall encrypted data packet. For example, in this embodiment, the encryption algorithm is an AES-128 encryption algorithm, and other encryption algorithms may also be used, which is not described in detailed herein.

In the method for encrypting the upgrade data packet provided in this embodiment, a double encryption approach is used during a firmware upgrade process. That is, each of the plurality of data packets obtained by splitting the upgrade data packet is first individually encrypted to obtain the plurality of individually encrypted data packets, and finally, the overall encryption is performed on the overall data packet generated based on the plurality of individually encrypted data packets, thereby effectively ensuring security of an upgrade file throughout a firmware upgrade process. In addition, compared with a single encryption approach, the double encryption approach used in the present disclosure is higher in security.

In one of implementations of this embodiment, in order to ensure that the to-be-upgraded device 30 in FIG. 1 can determine whether to upgrade firmware based on at least one of the plurality of data packets in the following step, after the encryption device 10 obtains the upgrade data packet, the method for encrypting the upgrade data packet further includes the following step: checking, by the encryption device 10, the upgrade data packet to obtain a first check code.

In this implementation, the encryption device 10 checks the upgrade data packet using a CRC-32 check algorithm. CRC-32 stands for Cyclic Redundancy Check, and is configured to detect an error in data transmission or storage, and generate a 32-bit check value by performing a polynomial division operation on data to verify integrity and accuracy of the data. In addition, other check algorithms may also be used for checking, which is not described in detailed herein.

Due to a fact that the upgrade data packet may be damaged or lost during a transmission process, after the upgrade data packet is obtained, the upgrade data packet may be checked to obtain the first check code. The first check code is used for subsequent data integrity verification of the upgrade data packet.

In one of implementations of this embodiment, in order to ensure that the to-be-upgraded device 30 in FIG. 1 can individually decrypt each of at least one individually encrypted data packet in the following step, after the encryption device 10 obtains the plurality of individually encrypted data packets, the method for encrypting the upgrade data packet further includes the following step: checking, by the encryption device 10, the at least one of the plurality of individually encrypted data packets to obtain at least one individually encrypted check code.

One individually encrypted data packet corresponds to one individually encrypted check code. That is to say, each of the at least one individually encrypted data packet is individually checked.

The encryption device 10 individually checks each individually encrypted data packet using a check algorithm. In this embodiment, the encryption device 10 adopts a CRC-32 check algorithm to individually check each individually encrypted data packet to generate the at least one individually encrypted check code. In addition, other check algorithms may also be used, which is not described in detailed herein.

Due to a fact that the individually encrypted data packet may be damaged or lost during a transmission process, after the individually encrypted data packet is obtained, the individually encrypted data packet may be checked to obtain the individually encrypted check code. The individually encrypted check code is used for subsequent data integrity verification of the individually encrypted data packet.

In one of implementations of this embodiment, in order to transmit the check code between different devices in the following step and to prevent a data packet from being erroneously transmit to an unmatched to-be-upgraded device, after the encryption device 10 obtains the overall encrypted data packet, the method for encrypting the upgrade data packet further includes the following step: embedding, by the encryption device 10, a device information frame into the overall encrypted data packet.

upgrade data packet further includes the following step: checking, by the encryption device 10, the overall encrypted data packet including the device information frame to obtain a second check code.

The encryption device 10 checks the overall encrypted data packet including the device information frame using a check algorithm. In this embodiment, the encryption device 10 adopts a CRC-32 check algorithm to check the overall encrypted data packet including the device information frame to generate the second check code. In addition, other check algorithms may also be used for checking, which is not described in detailed herein.

Due to a fact that the overall encrypted data packet including the device information frame may be damaged or lost during a transmission process, after the overall encrypted data packet including the device information frame is obtained, the overall encrypted data packet including the device information frame may be checked to obtain the second check code. The second check code is used for subsequent data integrity verification of the overall encrypted data packet including the device information frame. In addition, the overall encrypted data packet including the device information frame is checked, thereby effectively ensuring integrity and accuracy of data in the overall encrypted data packet.

In one of implementations of this embodiment, in order to implement transmission of the check code between different devices in the following step as described above, the method for encrypting the upgrade data packet further includes at least one of the following steps: writing, by the encryption device 10, the first check code into the device information frame, writing, by the encryption device 10, the second check code into the device information frame, or writing, by the encryption device 10, the at least one individually encrypted check code into the device information frame. That is to say, with transmission of the device information frame, different check codes are also transmitted.

Therefore, the device information frame further includes at least one of the following check codes: the first check code obtained by checking the upgrade data packet, the second check code obtained by checking the overall encrypted data packet including the device information frame, or the at least one individually encrypted check code obtained by checking the at least one of the plurality of individually encrypted data packets.

When only the first check code and the second check code are written into the device information frame, a format of the device information frame is as follows.

| Second check code | Board type | Hardware version | Firmware version | Preset packet length | Firmware length | Starting address | First check code |
|---|---|---|---|---|---|---|---|

In this embodiment, the device information frame includes information related to an instrument device (for example, the to-be-upgraded device 30 in FIG. 1), such as a board type, a hardware version, or a firmware version. In addition, the device information frame further includes the preset packet length.

In one of implementations of this embodiment, in order to ensure that the upgrade control device 20 in FIG. 1 can perform an overall decryption on the overall encrypted data packet in the following step, after the encryption device 10 embeds the device information frame into the overall encrypted data packet, the method for encrypting the The board type refers to a device type of the to-be-upgraded device 30. In this embodiment, the device type includes two categories, the first is a device category, and the second is the module category. The device category is represented by hexadecimal data, for example, the device category is represented using 0x01.

The hardware version refers to a version of the to-be-upgraded device 30, and is configured to distinguish different hardware devices or configurations.

The firmware version refers to a version of software firmware running on a to-be-tested device, and is configured to distinguish different software firmware versions.

The firmware length refers to a total byte length of the overall encrypted data packet.

The starting address refers to an address at which the firmware begins to run.

After the first check code, the second check code and the at least one individually encrypted check code are all written into the device information frame, a format of the device information frame is as follows.

| Second check code | Board type | Hardware version | Firmware version | Preset packet length | Firmware length | Starting address | At least one individually encrypted check code | First check code |
|---|---|---|---|---|---|---|---|---|

In one of implementations of this embodiment, in order to ensure that the upgrade control device 20 in FIG. 1 can determine whether to transmit the at least one individually encrypted data packet to the to-be-upgraded device 30, after the encryption device 10 obtains the overall encrypted data packet and before the encryption device 10 embeds the device information frame into the overall encrypted data packet, the method for encrypting the upgrade data packet further includes the following step: checking, by the encryption device 10, the overall encrypted data packet to obtain an overall encrypted check code.

The encryption device 10 checks the overall encrypted data packet using a check algorithm. In this embodiment, the encryption device 10 adopts a CRC-32 check algorithm to check the overall encrypted data packet to generate the overall encrypted check code. In addition, other check algorithms may also be used for checking, which is not described in detailed herein.

In order to transmit the overall encrypted check code between different devices, the encryption device 10 may further write the overall encrypted check code into the device information frame. Therefore, in addition to the first check code, the second check code and the at least one individually encrypted check code, the device information frame further includes the overall encrypted check code, and a format of the device information frame is as follows.

| Second check code | Board type | Hardware version | Firmware version | Preset packet length | Firmware length | Starting address | At least one individually encrypted check code | Overall encrypted check code | First check code |
|---|---|---|---|---|---|---|---|---|---|

It should be noted that the device information frame is dynamically changing. Every time a write operation is performed on the device information frame, the content within the device information frame undergoes a change. For example, when the overall encrypted data packet including the device information frame is checked to obtain the second check code, since the device information frame may include at least one of the first check code, the at least one individually encrypted check code, or the overall encrypted check code, the at least one of the first check code, the at least one individually encrypted check code, or the overall encrypted check code may also be checked, thereby preventing these check codes from being tampered with during a transmission process. The content included in the device information frame is not limited by the embodiments of the present disclosure when the overall encrypted data packet including the device information frame is checked.

In addition, in order to facilitate the use of the second check code in the following step for performing an overall decryption on the overall encrypted data packet including the device information frame, the second check code may be written into an initial address of the device information frame, and information from the board type to the at least one of the first check code, the at least one individually encrypted check code, or the overall encrypted check code are written into the device information frame following the initial address of the device information frame. However, writing positions of the information from the board type to the at least one of the first check code, the at least one individually encrypted check code, or the overall encrypted check code in the device information frame are not limited by the embodiments of the present disclosure, as long as the information are located after the second check code.

In one of implementations of this embodiment, since firmware upgrade is performed using a Bin file format, but a data format of the above upgrade data packet is a HEX file format, after the upgrade data packet is obtained, the method for encrypting the upgrade data packet further includes the following step: converting, by the encryption device 10 based on a preset data format conversion algorithm, a data format of the upgrade data packet from a HEX file format to a Bin file format.

In this embodiment, the data format conversion algorithm is a Hex2Bin algorithm, and is configured to convert a hexadecimal number into a binary number. The HEX file format is a text-based file format, and is configured to represent a hexadecimal representation form of binary data; and the Bin file format is a binary file format, and is configured for storing and transmitting binary data. Unlike the HEX file format, the Bin file format directly stores data in a binary form, and the Bin file format has no specific structure or metadata, and lacks address information, and therefore, when the firmware upgrade is performed, the Bin file format may be used for upgrading.

In the foregoing steps, when the upgrade data packet is checked to obtain the first check code, the upgrade data packet is in a Bin file format.

Figure 4:
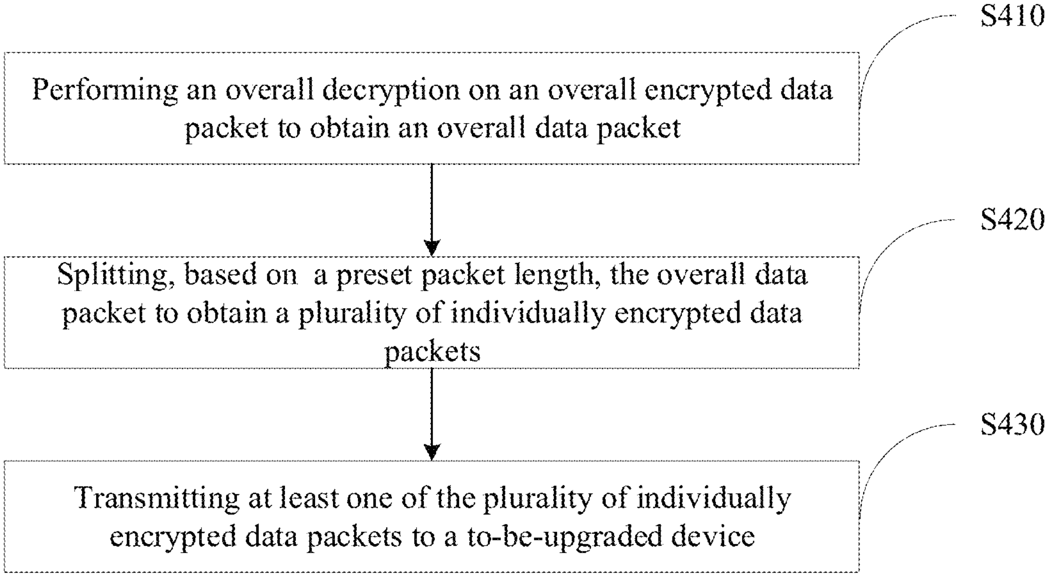
FIG. 4 is an overall flowchart of a first method for decrypting an upgrade data packet according to an embodiment of the present disclosure.

FIG. 4 is an overall flowchart of a first method for decrypting an upgrade data packet according to an embodiment of the present disclosure. The first method for decrypting the upgrade data packet in FIG. 4 is executed by the upgrade control device 20 mentioned in FIG. 1. The first method for decrypting the upgrade data packet shown in FIG. 4 corresponds to the aforementioned method for encrypting the upgrade data packet, and the first decrypting method includes the following steps.

S410: Performing an overall decryption on an overall encrypted data packet to obtain an overall data packet.

Before performing the overall decryption, the upgrade control device 20 may obtain the overall encrypted data packet. For example, the upgrade control device 20 obtains the overall encrypted data packet via a preset interface.

The upgrade control device 20 adopts a decryption algorithm to perform the overall decryption on the overall encrypted data packet. In this implementation, if an encryption algorithm adopted by the encryption device 10 during an overall encryption is an AES-128 encryption algorithm, the decryption algorithm adopted by the upgrade control device 20 during the overall decryption is an AES-128 decryption algorithm, that is, the decryption algorithm during the overall decryption corresponds to the encryption algorithm during the overall encryption. After the overall decryption is performed on the overall encrypted data packet, the overall data packet is obtained.

It should be understood that the overall data packet mentioned in the step S410 is a data packet after the overall decryption, and the overall data packet mentioned in the step S330 is a data packet before the overall encryption. An overall decryption object is the overall encrypted data packet, and the overall encrypted data packet mentioned herein may not include a device information frame, or may include the device information frame, which is not specifically limited by the embodiments of the present disclosure.

Since the overall encryption is to encrypt an overall data packet generated based on a plurality of individually encrypted data packets to obtain the overall encrypted data packet, the overall decryption is to decrypt the overall encrypted data packet to obtain the overall data packet generated based on the plurality of individually encrypted data packets. It should be understood that when the overall data packet is generated in a merging manner, the overall data packet generated based on the plurality of individually encrypted data packets is an overall data packet formed by merging the plurality of individually encrypted data packets.

S420: Splitting, based on a preset packet length, the overall data packet to obtain a plurality of individually encrypted data packets.

After the overall data packet is obtained, the upgrade control device 20, based on the preset packet length, splits the overall data packet into the plurality of individually encrypted data packets.

It should be understood that when the overall encrypted data packet includes the device information frame, since the device information frame includes the preset packet length, the preset packet length in the device information frame may be directly used for splitting. When the overall encrypted data packet does not include the device information frame, the device information frame may be obtained first. For example, the device information frame is obtained via a preset interface. Once the device information frame is obtained, the preset packet length in the device information frame is used for splitting.

Since the overall data packet is formed based on the plurality of individually encrypted data packets, for example, the overall data packet is formed by merging the plurality of individually encrypted data packets, the plurality of individually encrypted data packets may be obtained after the overall data packet is split.

S430: Transmitting at least one of the plurality of individually encrypted data packets to a to-be-upgraded device.

It should be understood that after the plurality of individually encrypted data packets are obtained, the upgrade control device 20 may transmit the plurality of individually encrypted data packets to the to-be-upgraded device 30 in FIG. 1, and the upgrade control device 20 may alternatively transmit only one individually encrypted data packet to the to-be-upgraded device 30, which is not specifically limited by the embodiments of the present disclosure.

When the upgrade control device 20 transmits the plurality of individually encrypted data packets to the to-be-upgraded device 30, in order to ensure accuracy of the individually encrypted data packets during transmission and prevent transmission errors, the upgrade control device 20 may transmit the plurality of individually encrypted data packets to the to-be-upgraded device 30 one by one.

It should be noted that the first method for decrypting the upgrade data packet provided in this embodiment is used for decrypting the overall encryption in the aforementioned method for encrypting the upgrade data packet. That is, the overall decryption is first performed on the overall encrypted data packet to obtain the overall data packet, then the overall data packet is split to obtain the at least one individually encrypted data packet, and finally the at least one individually encrypted data packet is transmitted to the to-be-upgraded device, thereby effectively ensuring security of data packet transmission throughout a firmware upgrade process.

In one of implementations of this embodiment, since the device information frame further includes a second check code, when the overall decryption is performed on the overall encrypted data packet, the upgrade control device 20 may perform the overall decryption using the second check code. Specifically, the step S410 includes the following steps: checking, by the upgrade control device 20, the overall encrypted data packet including the device information frame to obtain a third check code; and in a case that the third check code is consistent with the second check code, performing, by the upgrade control device 20, the overall decryption on the overall encrypted data packet to obtain the overall data packet.

During encryption, the second check code is obtained by the encryption device 10 through checking the overall encrypted data packet including the device information frame, and is written into the device information frame; and during decryption, the upgrade control device 20 checks the overall encrypted data packet including the device information frame to obtain the third check code.

The upgrade control device 20 checks the overall encrypted data packet including the device information frame using a check algorithm. In this embodiment, if the encryption device 10 adopts a CRC-32 check algorithm to check the overall encrypted data packet including the device information frame after the overall encryption, a check algorithm adopted by the upgrade control device 20 to check the overall encrypted data packet including the device information frame is also the CRC-32 check algorithm before the overall decryption, that is, the check algorithm adopted by the overall encryption is consistent with the check algorithm adopted by overall decryption.

In a case that the third check code is consistent with the second check code, it indicates that the check succeeds. In this case, the upgrade control device 20 performs the overall decryption on the overall encrypted data packet including the device information frame to obtain the overall data packet.

In a case that the third check code is inconsistent with the second check code, it indicates that the check fails. In this case, it is determined that the process is terminated, that is, the upgrade control device 20 stops performing the overall decryption on the overall encrypted data packet.

In this implementation, the second check code obtained after the overall encryption is compared with the third check code obtained before the overall decryption to ensure integrity and accuracy of the overall encrypted data packet, and the overall decryption is performed on the overall encrypted data packet only after it is determined that the overall encrypted data packet is correct, thereby ensuring security of data packet transmission throughout a firmware upgrade process.

In one of implementations of this embodiment, before the upgrade control device 20 transmits the at least one of the plurality of individually encrypted data packets to the to-be-upgraded device 30, the first decrypting method further includes the following steps: transmitting, by the upgrade control device 20, the device information frame to the to-be-upgraded device 30; and in a case that a match message received by the upgrade control device 20 from the to-be-upgraded device 30 is a match success message, sending, by the upgrade control device 20, a start upgrade command to the to-be-upgraded device 30.

The upgrade control device 20 transmits the device information frame to the to-be-upgraded device 30, mainly for the to-be-upgraded device 30 to generate the match message based on the device information frame and device information of the to-be-upgraded device 30.

The device information of the to-be-upgraded device 30 includes a hardware version of the to-be-upgraded device 30, and the match message includes a match success message and a match failure message. Since the device information frame includes the hardware version of the to-be-upgraded device 30, in a case that the hardware version in the device information of the to-be-upgraded device 30 is consistent with a hardware version in the device information frame, it indicates a success matching. In this case, the to-be-upgraded device 30 generates the match success message. In a case that the hardware version in the device information of the to-be-upgraded device 30 is inconsistent with the hardware version in the device information frame, it indicates a failure matching. In this case, the to-be-upgraded device 30 generates the match failure message, and it is determined that the process is terminated, stopping to perform a subsequent step. For example, the upgrade control device 20 stops executing the step of sending the start upgrade command to the to-be-upgraded device 30.

The upgrade control device 20 sends the start upgrade command to the to-be-upgraded device 30, mainly for the to-be-upgraded device 30 to determine whether to perform a handshake with the upgrade control device 20.

In a case that the match message received by the upgrade control device 20 from the to-be-upgraded device 30 is the match success message, the upgrade control device 20 sends the start upgrade command to the to-be-upgraded device 30 to instruct the to-be-upgraded device 30 to start upgrade. Upon receiving the start upgrade command, the to-be-upgraded device 30 performs the handshake with a host computer (that is, the upgrade control device 20), and returns a handshake message. The handshake message includes a handshake success message and a handshake failure message.

The handshake between the to-be-upgraded device 30 and the upgrade control device 20 refers to a process of communication and confirmation between the to-be-upgraded device 30 and the upgrade control device 20, so as to ensure that communication connection between them is normal and to prepare for an upgrade operation. In a case that the handshake succeeds, the to-be-upgraded device 30 returns the handshake success message to the upgrade control device 20; and in a case that the handshake fails, the to-be-upgraded device 30 returns the handshake failure message to the upgrade control device 20.

The device information frame is transmitted by the upgrade control device 20 and the match message is generated by the to-be-upgraded device 30, which effectively prevents the individually encrypted data packet from being transmitted incorrectly to a mismatched to-be-upgraded device, thereby improving accuracy of upgrade.

The timing when the upgrade control device 20 transmits the at least one individually encrypted data packet to the to-be-upgraded device 30 is when the upgrade control device 20 receives the handshake success message from the to-be-upgraded device 30. That is, in a case that the handshake message received by the upgrade control device 20 from the to-be-upgraded device 30 is the handshake success message, the upgrade control device 20 transmits the at least one individually encrypted data packet to the to-be-upgraded device 30.

It should be noted that in addition to that the upgrade control device 20 receives the handshake success message from the to-be-upgraded device 30, the timing for the upgrade control device 20 to transmit the at least one individually encrypted data packet to the to-be-upgraded device 30 may also be determined based on a form of the check. For example, as mentioned above, after the overall encrypted data packet is obtained and before the device information frame is embedded into the overall encrypted data packet, the encryption device 10 checks the overall encrypted data packet to obtain an overall encrypted check code. In this embodiment, after the overall data packet is split to obtain the plurality of individually encrypted data packets, the upgrade control device 20 performs an overall check on the plurality of individually encrypted data packets to obtain an overall decrypted check code, and compares the overall decrypted check code with the overall encrypted check code. In a case that the overall decrypted check code is consistent with the overall encrypted check code, the upgrade control device 20 executes the step of transmitting the at least one individually encrypted data packet to the to-be-upgraded device 30, and in a case that the overall decrypted check code is inconsistent with the overall encrypted check code, it is determined that the process is terminated, stopping to take any actions. That is to say, the timing when the upgrade control device 20 transmits the at least one individually encrypted data packet to the to-be-upgraded device 30 may also be when the overall decrypted check code is consistent with the overall encrypted check code.

The timing for the upgrade control device 20 to transmit the at least one individually encrypted data packet to the to-be-upgraded device 30 may also include the above two timings. That is, the upgrade control device 20 transmits the at least one individually encrypted data packet to the to-be-upgraded device 30 only when the upgrade control device 20 receives the handshake success message from the to-be-upgraded device 30 and the overall decrypted check code is consistent with the overall encrypted check code. However, an execution order of these two timings is not limited by the embodiments of the present disclosure.

However, no matter what kind of timing the upgrade control device 20 uses to transmit the at least one individually encrypted data packet to the to-be-upgraded device 30, and no matter whether the upgrade control device 20 has the timing to transmit the at least one individually encrypted data packet to the to-be-upgraded device 30, when the upgrade control device 20 transmits the plurality of individually encrypted data packets to the to-be-upgraded device

30, the upgrade control device 20 may transmit the plurality of individually encrypted data packets to the to-be-upgraded device 30 one by one.

The transmitting, by the upgrade control device 20, the plurality of individually encrypted data packets to the to-be-upgraded device 30 one by one includes the following step: transmitting, by the upgrade control device 20 based on a preset sequence, the plurality of individually encrypted data packets to the to-be-upgraded device 30 one by one.

The preset sequence is determined based on a sequence of the plurality of individually encrypted data packets formed when the overall data packet is split. During a process of transmitting the plurality of individually encrypted data packets one by one, the plurality of individually encrypted data packets may be transmitted in the preset sequence, so as to avoid transmission errors.

For example, the transmitting the plurality of individually encrypted data packets one by one may be executed through the following steps: transmitting, by the upgrade control device 20, a first individually encrypted data packet of the plurality of individually encrypted data packets to the to-be-upgraded device 30 (step a); in a case that the upgrade control device 20 receives a success reply message from the to-be-upgraded device 30, transmitting, by the upgrade control device 20, a second individually encrypted data packet of the plurality of individually encrypted data packets to the to-be-upgraded device 30 (step b); and repeating the steps a) and b) until the upgrade control device 20 completes one-by-one transmission of the plurality of individually encrypted data packets.

The first individually encrypted data packet and the second individually encrypted data packet are two adjacent individually encrypted data packets formed when the overall data packet is split. In a case that the handshake message received by the upgrade control device 20 from the to-be-upgraded device 30 is the handshake success message, the upgrade control device 20 executes the step a).

After receiving the first individually encrypted data packet, the to-be-upgraded device 30 first determines information, such as a format, integrity or a version, of the first individually encrypted data packet. In a case that the information, such as the format, the integrity or the version, of the first individually encrypted data packet all meet a requirement, the to-be-upgraded device 30 returns the success reply message to the upgrade control device 20; and in a case that any one of the information, such as the format, the integrity or the version, of the first individually encrypted data packet does not meet a requirement, the to-be-upgraded device 30 returns a failure reply message to the upgrade control device 20. But it should be noted that feedback conditions of the success reply message and the failure reply message are not specifically limited by the embodiments of the present disclosure. For example, in a case that at least one of the information, such as the format, the integrity or the version, of the first individually encrypted data packet meets the requirement, the to-be-upgraded device 30 returns the success reply message to the upgrade control device 20; and in a case that all the information, such as the format, the integrity or the version, of the first individually encrypted data packet do not meet the requirement, the to-be-upgraded device 30 returns the failure reply message to the upgrade control device 20.

In a case that the upgrade control device 20 receives the success reply message from the to-be-upgraded device 30, the upgrade control device 20 transmits a next individually encrypted data packet (that is, the second individually encrypted data packet) to the to-be-upgraded device 30 in sequence.

The plurality of individually encrypted data packets are transmitted one by one based on receiving the success reply message from the to-be-upgraded device 30, which effectively reduces a risk of the plurality of individually encrypted data packets being tampered with or intercepted, thereby ensuring security of transmission of the plurality of individually encrypted data packets.

In one of implementations of this embodiment, the first decrypting method further includes the following steps: in a case that the upgrade control device 20 does not receive the success reply message from the to-be-upgraded device 30, resending, by the upgrade control device 20, a start upgrade command to the to-be-upgraded device 30 at each preset time interval; and in a case that a number of times the start upgrade command is resent reaches a preset threshold number of times, outputting, by the upgrade control device 20, error reporting information.

The preset time interval is not specifically limited by the embodiments of the present disclosure, and a person skilled in the art may select the preset time interval based on actual requirements, for example, the preset time period is 5 s. The preset threshold number of times is not specifically limited by the embodiments of the present disclosure, and a person skilled in the art may select the preset threshold number of times based on actual requirements, for example, the preset threshold number of times is three.

In a case that the upgrade control device 20 does not receive the success reply message from the to-be-upgraded device 30, the upgrade control device 20 resends the start upgrade command at each preset time interval, which ensures that an upgrade process of the to-be-upgraded device 30 can be re-triggered in a case of loss of a reply caused by communication failure or other reasons, thereby helping to improve stability and a success rate of the upgrade process. In a case that the number of times the upgrade control device 20 resends the start upgrade command reaches the preset threshold number of times, the error reporting information is output, which can effectively avoid infinite retries, thereby preventing the upgrade process from falling into a deadlock or a prolonged waiting state. The error reporting information is used to alert an operator or a system administrator to intervene or make repairs.

Figure 5:
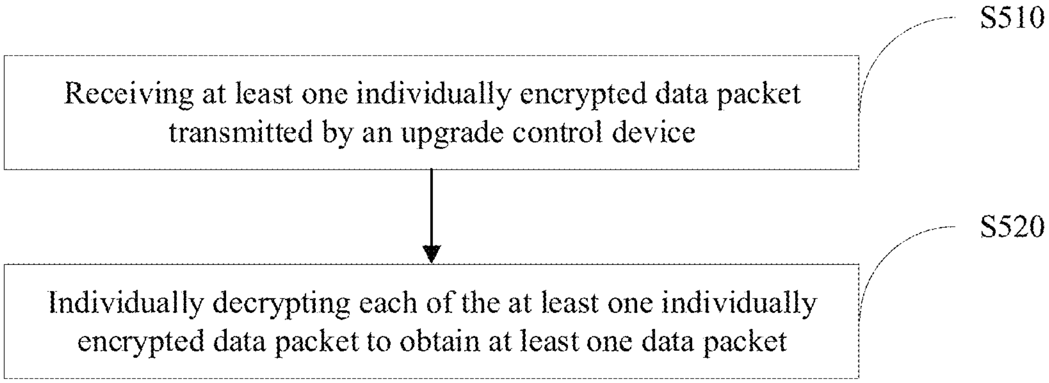
FIG. 5 is an overall flowchart of a second method for decrypting an upgrade data packet according to an embodiment of the present disclosure.

FIG. 5 is an overall flowchart of a second method for decrypting an upgrade data packet according to an embodiment of the present disclosure. The second method for decrypting the upgrade data packet in FIG. 5 is executed by the to-be-upgraded device 30 mentioned in FIG. 1. The second method for decrypting the upgrade data packet shown in FIG. 5 corresponds to both the aforementioned method for encrypting the upgrade data packet and the aforementioned first decrypting method, and the second decrypting method includes the following steps.

S510: Receiving at least one individually encrypted data packet transmitted by an upgrade control device.

The to-be-upgraded device 30 receives the at least one individually encrypted data packet transmitted by the upgrade control device 20. In the embodiments of the present disclosure, the to-be-upgraded device 30 may be a medical instrument.

S520: Individually decrypting each of the at least one individually encrypted data packet to obtain at least one data packet.

The to-be-upgraded device 30 adopts a decryption algorithm to individually decrypt each of the at least one individually encrypted data packet to obtain the at least one data packet. In this implementation, if an encryption algorithm adopted by the encryption device 10 during an individual encryption is an AES-128 encryption algorithm, the decryption algorithm adopted by the to-be-upgraded device 30 during an individual decryption is an AES-128 decryption algorithm, that is, the decryption algorithm during the individual decryption corresponds to the encryption algorithm during the individual encryption. After each individually encrypted data packet is decrypted individually, the at least one data packet is obtained.

It should be understood that the at least one data packet mentioned in the step S520 is a data packet after the individual decryption, and the plurality of data packets mentioned in the step S310 are data packets before the individual encryption.

It should be noted that the second method for decrypting the upgrade data packet provided in this embodiment is used for decrypting the individual encryption in the aforementioned method for encrypting the upgrade data packet. That is, the at least one individually encrypted data packet transmitted by the upgrade control device is first received, and each of the at least one individually encrypted data packet is individually decrypted to obtain the at least one data packet, thereby effectively ensuring security of data packet transmission throughout a firmware upgrade process.

In the aforementioned method for encrypting the upgrade data packet, the overall encryption and the individual encryption are both performed on the encryption device 10. In the aforementioned first method for decrypting the upgrade data packet, the overall decryption corresponding to the overall encryption is performed on the upgrade control device 20. In the aforementioned second method for decrypting the upgrade data packet, the individual decryption corresponding to the individual encryption is performed on the to-be-upgraded device 30. The aforementioned encrypting method is performed on the encryption device 10, and the decrypting method is distributed and performed on the upgrade control device 20 and the to-be-upgraded device 30, which effectively reduces a risk of a data packet being stolen and tampered with during a transmission process. In addition, if the decrypting method is performed on one device, a load of the one device is increased, which reduces upgrade efficiency. Therefore, in the embodiments of the present disclosure, the decrypting method is distributed on different devices, thereby effectively improving upgrade efficiency.

In one of implementations of this embodiment, before the to-be-upgraded device 30 receives the at least one individually encrypted data packet transmitted by the upgrade control device 20, the second decrypting method further includes the following steps: in a case that a device information frame corresponding to the at least one individually encrypted data packet matches device information of the to-be-upgraded device 30, generating, by the to-be-upgraded device 30, a match success message, and transmitting, by the to-be-upgraded device 30, the match success message to the upgrade control device 20; and in a case that the start upgrade command sent by the upgrade control device 20 is received by the to-be-upgraded device 30, performing, by the to-be-upgraded device 30, a handshake with the upgrade control device 20.

Before the device information frame is matched with the device information of the to-be-upgraded device 30, the to-be-upgraded device 30 may receive the device information frame transmitted by the upgrade control device 20. When the upgrade control device 20 transmits the at least one individually encrypted data packet to the to-be-upgraded device 30, the to-be-upgraded device 30 receives the device information frame.

The to-be-upgraded device 30 generates the match success message, and transmits the match success message to the upgrade control device 20, mainly for the upgrade control device 20 to determine whether to send the start upgrade command to the to-be-upgraded device 30.

The device information includes a content, such as a board type or a hardware version, of the to-be-upgraded device 30. In a case that the content, such as the board type or the hardware version, in the device information corresponds respectively and consistently with a board type or a hardware version in the device information frame, it indicates that the device information frame matches the device information. In a case that the device information frame matches the device information, the to-be-upgraded device 30 generates the match success message, and transmits the match success message to the upgrade control device 20.

The upgrade control device 20 is configured to send the start upgrade command to the to-be-upgraded device 30 based on the match success message. In a case that the to-be-upgraded device 30 receives the start upgrade command sent by the upgrade control device 20, the to-be-upgraded device 30 performs the handshake with the upgrade control device 20. In this case, the to-be-upgraded device 30 may return a handshake message to the upgrade control device 20, where the handshake message includes a handshake success message and a handshake failure message. In a case that the handshake between the to-be-upgraded device 30 and the upgrade control device 20 succeeds, the handshake success message is transmitted to the upgrade control device 20, and in a case that the handshake between the to-be-upgraded device 30 and the upgrade control device 20 fails, the handshake failure message is transmitted to the upgrade control device 20.

The timing when the to-be-upgraded device 30 receives the at least one individually encrypted data packet transmitted by the upgrade control device 20 is when the to-be-upgraded device 30 transmits the handshake success message to the upgrade control device 20. Transmitting, by the to-be-upgraded device 30, the handshake success message to the upgrade control device 20 is used to enable the upgrade control device 20 to determine whether to transmit the at least one individually encrypted data packet to the to-be-upgraded device 30. That is to say, after receiving the handshake success message, the upgrade control device 20 transmits the at least one individually encrypted data packet to the to-be-upgraded device 30. In this case, the to-be-upgraded device 30 receives the at least one individually encrypted data packet transmitted by the upgrade control device 20.

In other words, the to-be-upgraded device 30 receives the at least one individually encrypted data packet transmitted by the upgrade control device 20, after undergoing processes of the device information matching and the handshake, so as to ensure integrity and accuracy of the at least one individually encrypted data packet received.

However, no matter whether the to-be-upgraded device 30 has the timing to receive the at least one individually encrypted data packet transmitted by the upgrade control device 20, the to-be-upgraded device 30 may receive the plurality of individually encrypted data packets transmitted by the upgrade control device 20 one by one when the to-be-upgraded device 30 receives the plurality of individually encrypted data packets transmitted by the upgrade control device 20. It should be understood that one-by-one transmission of the plurality of individually encrypted data packets by the upgrade control device 20 corresponds to one-by-one reception of the plurality of individually encrypted data packets by the to-be-upgraded device 30.

Receiving, by the to-be-upgraded device 30, the plurality of individually encrypted data packets transmitted by the upgrade control device 20 one by one includes the following step: receiving, by the to-be-upgraded device 30 based on a preset sequence, the plurality of individually encrypted data packets transmitted by the upgrade control device 20 one by one.

During the one-by-one transmission of the plurality of individually encrypted data packets, the plurality of individually encrypted data packets may be transmitted in the preset sequence, so as to avoid transmission errors.

In correspondence to the upgrade control device 20 repeatedly performing the steps a) and b), the to-be-upgraded device 30 may repeatedly perform the following steps c) and d) to complete the one-by-one reception of the plurality of individually encrypted data packets. Specifically, the to-be-upgraded device 30 receives a first individually encrypted data packet of the plurality of individually encrypted data packets transmitted by the upgrade control device 20, and transmits a success reply message to the upgrade control device 20, which enables the upgrade control device 20 to transmit a second individually encrypted data packet of the plurality of individually encrypted data packets to the to-be-upgraded device 30 based on the success reply message (step c); the to-be-upgraded device 30 receives the second individually encrypted data packet transmitted by the upgrade control device 20 (step d); and the to-be-upgraded device 30 repeats the steps c) and d) until the to-be-upgraded device 30 completes the one-by-one reception of the plurality of individually encrypted data packets.

After receiving the first individually encrypted data packet, the to-be-upgraded device 30 performs the same determination on information, such as a format, integrity, or a version, of the first individually encrypted data packet as those conducted during the one-by-one transmission to obtain the success reply message, and returns the success reply message to the upgrade control device 20. After receiving the success reply message, the upgrade control device 20 transmits the second individually encrypted data packet to the to-be-upgraded device 30. In this case, the to-be-upgraded device 30 receives the second individually encrypted data packet transmitted by the upgrade control device 20.

Since the upgrade control device 20 transmits the plurality of individually encrypted data packets to the to-be-upgraded device 30 one by one, after receiving one individually encrypted data packet transmitted by the upgrade control device 20, the to-be-upgraded device 30 repeatedly performs the loop steps until all the individually encrypted data packets are received.

The plurality of individually encrypted data packets are transmitted one by one based on transmitting the success reply message to the upgrade control device 20, which effectively reduces a risk of the plurality of individually encrypted data packets being tampered with or intercepted, thereby ensuring security of transmission of the plurality of individually encrypted data packets.

In one of implementations of this embodiment, when the to-be-upgraded device 30 is configured with a memory, and after the to-be-upgraded device 30 obtains the at least one data packet, the second decrypting method further includes the following step: storing, by the to-be-upgraded device 30, the at least one data packet to a preset memory.

Certainly, the second decrypting method may not include the step of storing the at least one data packet to the preset memory, and the step of storing the at least one data packet to the preset memory may be performed in an upgrading method described below, which is not specifically limited by the embodiments of the present disclosure.

The to-be-upgraded device 30 stores the at least one data packet to the preset memory, so as to enable the to-be-upgraded device 30 to invoke the at least one data packet in the preset memory for upgrading.

It should be understood that when the to-be-upgraded device 30 receives the plurality of individually encrypted data packets one by one, after receiving one individually encrypted data packet, the to-be-upgraded device 30 may immediately perform the subsequent steps of the individual decryption and storage in the preset memory. Alternatively, after receiving a part of the individually encrypted data packets, the to-be-upgraded device 30 may accumulate these individually encrypted data packets, and collectively perform the subsequent steps of the individual decryption and storage in the preset memory. This is not specifically limited by the embodiments of the present disclosure.

As described above, after receiving the first individually encrypted data packet transmitted by the upgrade control device 20, the to-be-upgraded device 30 transmits the success reply message to the upgrade control device 20. The timing for the to-be-upgraded device 30 to transmit the success reply message may be the time after the to-be-upgraded device 30 completes the steps of individually decrypting the first individually encrypted data packet and storing the first individually encrypted data packet in the preset memory. After receiving the success reply message, the upgrade control device 20 transmits the second individually encrypted data packet to the to-be-upgraded device 30. The timing for the to-be-upgraded device 30 to transmit the success reply message is not specifically limited by the embodiments of the present disclosure. After receiving the first individually encrypted data packet transmitted by the upgrade control device 20, the to-be-upgraded device 30 may also transmit the success reply message immediately.

In one of implementations of this embodiment, since the device information frame corresponding to the at least one individually encrypted data packet includes at least one individually encrypted check code, when individually decrypting each of the at least one individually encrypted data packet, the to-be-upgraded device 30 may perform the individual decryption using the at least one individually encrypted check code. Specifically, the step S520 includes the following steps: checking, by the to-be-upgraded device 30, the at least one individually encrypted data packet to obtain at least one individually decrypted check code; and in a case that the at least one individually decrypted check code is consistent with the at least one individually encrypted check code, individually decrypting, by the to-be-upgraded device 30, each of the at least one individually encrypted data packet to obtain the at least one data packet.

The at least one individually encrypted check code is obtained by the encryption device 10 through checking the at least one individually encrypted data packet.

It should be noted that in the method for encrypting the upgrade data packet, after individually encrypting the plurality of data packets, the encryption device 10 obtains the plurality of individually encrypted data packets, checks the at least one of the plurality of individually encrypted data packets to obtain the at least one individually encrypted check code, and writes the at least one individually encrypted check code into the device information frame. In the second method for decrypting the upgrade data packet provided in this embodiment, after receiving the at least one individually encrypted data packet transmitted by the upgrade control device 20 and before individually decrypting the at least one individually encrypted data packet, the to-be-upgraded device 30 may check the at least one individually encrypted data packet to obtain the at least one individually decrypted check code, and determine whether the at least one individually decrypted check code is consistent with the at least one individually encrypted check code. In a case that the at least one individually decrypted check code is consistent with the at least one individually encrypted check code, the to-be-upgraded device 30 performs the step of individually decrypting the at least one individually encrypted data packet. In a case that the at least one individually decrypted check code is inconsistent with the at least one individually encrypted check code, it is determined that the process is terminated, stopping to take any actions. For example, when the at least one individually decrypted check code includes a plurality of individually decrypted check codes, and the at least one individually encrypted check code includes a plurality of individually encrypted check codes, the to-be-upgraded device 30 determines whether the plurality of individually decrypted check codes are consistent with the plurality of individually encrypted check codes, respectively. In a case that all the plurality of individually decrypted check codes are consistent with respective individually encrypted check codes, the to-be-upgraded device 30 performs the step of individually decrypting the plurality of individually encrypted data packets. In a case that there is one individually decrypted check code that is inconsistent with a corresponding individually encrypted check code, it is determined that the process is terminated, stopping to take any actions.

Figure 6:
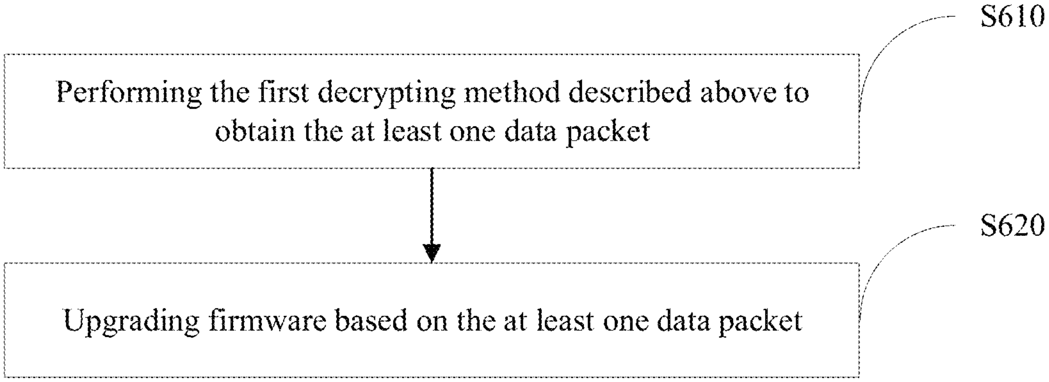
FIG. 6 is an overall flowchart of a method for upgrading firmware according to an embodiment of the present disclosure.

FIG. 6 is an overall flowchart of a method for upgrading firmware according to an embodiment of the present disclosure. The method for upgrading the firmware in FIG. 6 is executed by the to-be-upgraded device 30 mentioned in FIG. 1. The method for upgrading the firmware shown in FIG. 6 corresponds to the aforementioned method for encrypting the upgrade data packet, and includes the aforementioned first decrypting method. The upgrading method includes the following steps.

S610: Performing the first decrypting method described above to obtain the at least one data packet.

It should be understood that in the aforementioned first decrypting method, the to-be-upgraded device 30 may receive only one individually encrypted data packet, and the to-be-upgraded device 30 may also receive a plurality of individually encrypted data packets.

Effects of executing the aforementioned first decrypting method by the to-be-upgraded device 30, as well as a specific description of the aforementioned first decrypting method, are referred to the above and are not described in detailed herein.

S620: Upgrading firmware based on the at least one data packet.

When the to-be-upgraded device 30 receives only one individually encrypted data packet, there is one data packet obtained through an individual decryption, and the firmware is upgraded based on the one data packet; and when the to-be-upgraded device 30 receives a plurality of data packets, there are a plurality of data packets obtained through an individual decryption, and the firmware is upgraded based on the plurality of data packets.

When the firmware is upgraded based on the plurality of data packets, the plurality of data packets may be checked to obtain a fourth check code, and in a case that the fourth check code is consistent with a first check code, the firmware is upgraded based on the at least one of the plurality of data packets.

A device information frame corresponding to the plurality of individually encrypted data packets includes the first check code, and the first check code is obtained by the encryption device 10 through checking an upgrade data packet.

The to-be-upgraded device 30 checks the plurality of data packets using a check algorithm to obtain the fourth check code. In this embodiment, if the encryption device 10 adopts a CRC-32 check algorithm to check the upgrade data packet after obtaining the upgrade data packet, the to-be-upgraded device 30 also adopts the CRC-32 check algorithm to check the plurality of data packets.

It should be understood that the to-be-upgraded device 30 performs an overall check on the plurality of data packets to obtain the fourth check code.

In a case that the fourth check code is consistent with the first check code, it indicates that the plurality of data packets are not tampered with or damaged, and the to-be-upgraded device 30 upgrades the firmware based on the at least one of the plurality of data packets. In other words, the timing for upgrading the firmware based on the at least one data packet is when the fourth check code is consistent with the first check code.

It should be noted that in the method for upgrading the firmware provided in this embodiment, the plurality of data packets are first checked to obtain the fourth check code, and the fourth check code is compared with the first check code to determine whether to upgrade the firmware, so as to effectively ensure integrity and accuracy of a data packet.

It should be understood that when the to-be-upgraded device 30 is configured with a memory, before the plurality of data packets are checked, the plurality of data packets may be stored in a preset memory.

In one of implementations of this embodiment, no matter whether there is the timing for upgrading the firmware, when the to-be-upgraded device 30 is configured with the memory, the step S620 includes the following steps: reading, by the to-be-upgraded device 30, a program update flag of an application of the firmware based on a preset upgrade program; determining, by the to-be-upgraded device 30, a flag bit of an upgrade flag based on the program update flag; and in a case that the flag bit of the upgrade flag is set, invoking, by the to-be-upgraded device 30 based on the preset upgrade program, the at least one data packet stored in the preset memory to upgrade the application of the firmware.

In this embodiment, an upgrade program is a Bootloader, and the Bootloader is a piece of boot code located in the preset memory, and is configured to load and start an operating system or other applications when the to-be-upgraded device 30 is powered on or restarted. The program update flag is used to indicate whether the application of the firmware has an available updated identifier. The application of the firmware may be understood as software code on the to-be-upgraded device 30, that is, code on the firmware.

The to-be-upgraded device 30 determines whether the flag bit of the upgrade flag is set or not set based on the program update flag. When the flag bit of the upgrade flag is set, it indicates that the to-be-upgraded device 30 needs to perform an upgrade operation, and there is a difference between a version of the application of the firmware on the to-be-upgraded device 30 and an available updated version, update may be performed to keep the application of the firmware in a latest state. When the flag of the upgrade flag is not set, it indicates that the to-be-upgraded device 30 does not need to perform an upgrade operation, and there is no difference between the version of the application of the firmware on the to-be-upgraded device 30 and the available updated version, so there is no need to perform the update.

In other words, in a case that the flag bit of the upgrade flag is set, the to-be-upgraded device 30 upgrades the application of the firmware based on the upgrade program; and in a case that the flag bit of the upgrade flag is not set, the to-be-upgraded device 30 cancels the upgrade of the application of the firmware, jumps to a start address of the application of the firmware, and launches an existing application of the firmware.

Therefore, when the application of the firmware is updated, whether to upgrade the application of the firmware is determined based on the program update flag and the upgrade flag, so as to ensure that the application of the firmware is always in a latest version.

Figure 7:
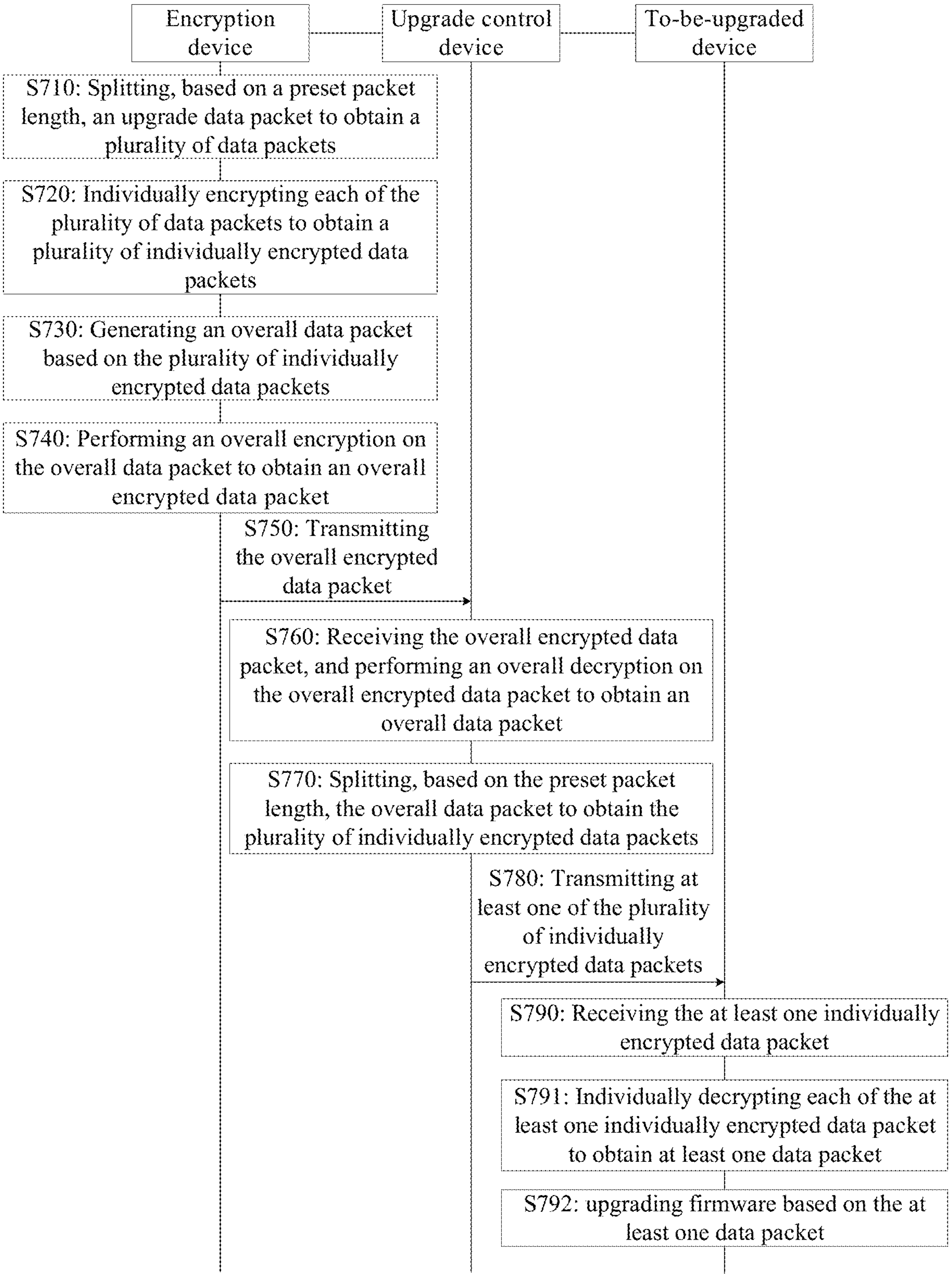
FIG. 7 is an overall flowchart of a method for encrypting an upgrade data packet, a first method for decrypting an upgrade data packet, a second method for decrypting an upgrade data packet, and a method for upgrading firmware according to an embodiment of the present disclosure.

FIG. 7 is an overall flowchart of a method for encrypting an upgrade data packet, a first method for decrypting an upgrade data packet, a second method for decrypting an upgrade data packet, and a method for upgrading firmware according to an embodiment of the present disclosure. An encryption device, an upgrade control device, and a to-be-upgraded device in FIG. 7 may respectively correspond to the encryption device 10, the upgrade control device 20, and the to-be-upgraded device 30 in FIG. 1. For the sake of brevity, repetitive descriptions are appropriately omitted.

As shown in FIG. 7, in step S710, splitting, by the encryption device 10 based on a preset packet length, an upgrade data packet to obtain a plurality of data packets; in step S720, individually encrypting, by the encryption device 10, each of the plurality of data packets to obtain a plurality of individually encrypted data packets; in step S730, generating, by the encryption device 10, an overall data packet based on the plurality of individually encrypted data packets; in step S740, performing, by the encryption device 10, an overall encryption on the overall data packet to obtain an overall encrypted data packet; in step S750, transmitting, by the encryption device 10, the overall encrypted data packet to the upgrade control device 20; in step S760, receiving, by the upgrade control device 20, the overall encrypted data packet, and performing, by the upgrade control device 20, an overall decryption on the overall encrypted data packet to obtain an overall data packet; in step S770, splitting, by the upgrade control device 20 based on the preset packet length, the overall data packet to obtain the plurality of individually encrypted data packets; in step S780, transmitting, by the upgrade control device 20, at least one of the plurality of individually encrypted data packets to the to-be-upgraded device 30; in step S790, receiving, by the to-be-upgraded device 30, the at least one individually encrypted data packet transmitted by the upgrade control device 20; in step S791, individually decrypting, by the to-be-upgraded device 30, each of the at least one individually encrypted data packet to obtain at least one data packet; and in step S792, upgrading, by the to-be-upgraded device 30, firmware based on the at least one data packet.

Figure 8:
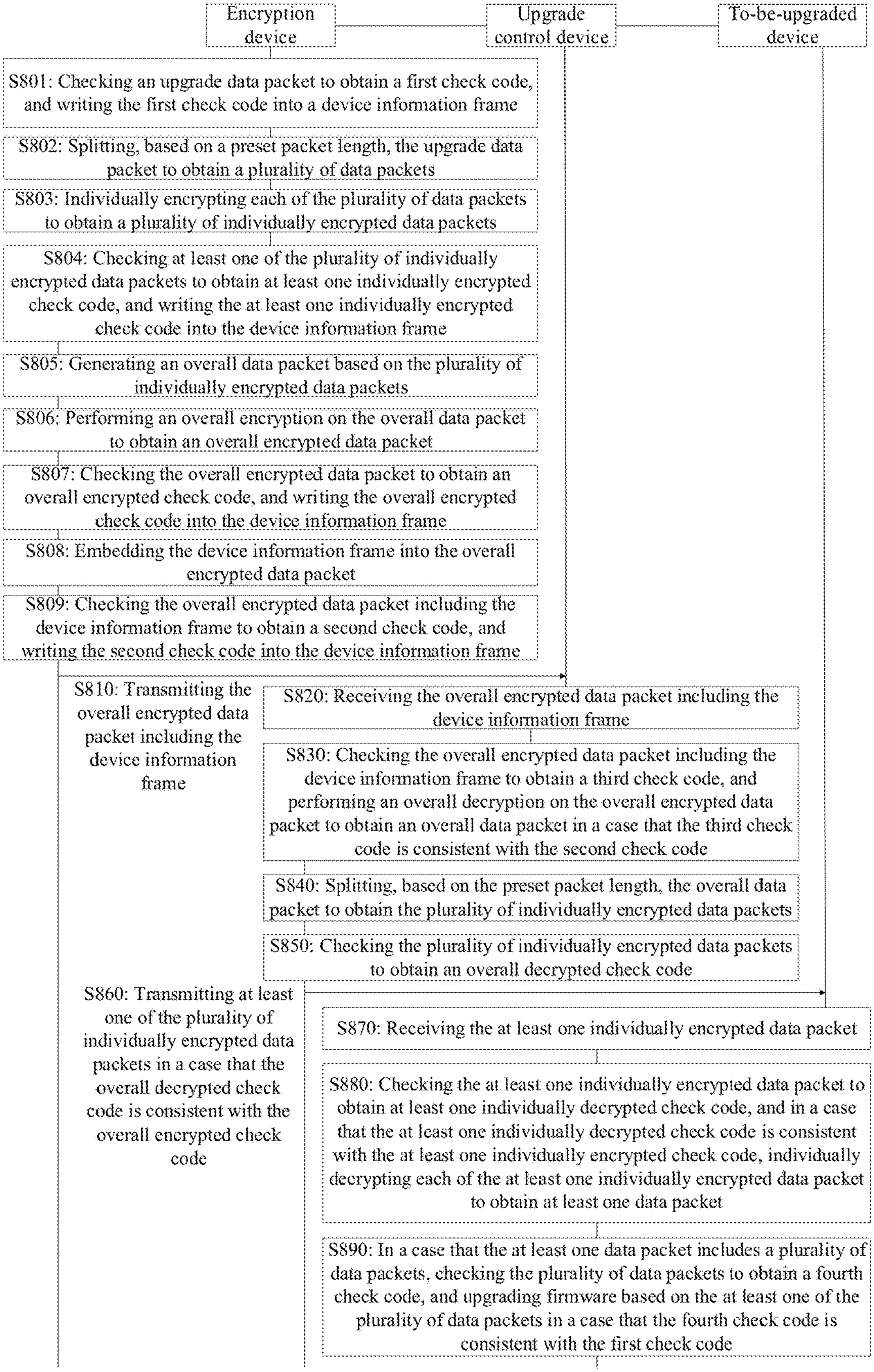
FIG. 8 is an overall flowchart of a method for encrypting an upgrade data packet, a first method for decrypting an upgrade data packet, a second method for decrypting an upgrade data packet, and a method for upgrading firmware according to another embodiment of the present disclosure.

FIG. 8 is an overall flowchart of a method for encrypting an upgrade data packet, a first method for decrypting an upgrade data packet, a second method for decrypting an upgrade data packet, and a method for upgrading firmware according to another embodiment of the present disclosure. An encryption device, an upgrade control device, and a to-be-upgraded device in FIG. 8 may respectively correspond to the encryption device 10, the upgrade control device 20, and the to-be-upgraded device 30 in FIG. 1. For the sake of brevity, repetitive descriptions are appropriately omitted.

As shown in FIG. 8, in step S801, checking, by the encryption device 10, an upgrade data packet to obtain a first check code, and writing, by the encryption device 10, the first check code into a device information frame; in step S802, splitting, by the encryption device 10 based on a preset packet length, the upgrade data packet to obtain a plurality of data packets; in step S803, individually encrypting, by the encryption device 10, each of the plurality of data packets to obtain a plurality of individually encrypted data packets; in step S804, checking, by the encryption device 10, at least one of the plurality of individually encrypted data packets to obtain at least one individually encrypted check code, and writing, by the encryption device 10, the at least one individually encrypted check code into the device information frame; in step S805, generating, by the encryption device 10, an overall data packet based on the plurality of individually encrypted data packets; in step S806, performing, by the encryption device 10, an overall encryption on the overall data packet to obtain an overall encrypted data packet; in step S807, checking, by the encryption device 10, the overall encrypted data packet to obtain an overall encrypted check code, and writing, by the encryption device 10, the overall encrypted check code into the device information frame; in step S808, embedding, by the encryption device 10, the device information frame into the overall encrypted data packet; in step S809, checking, by the encryption device 10, the overall encrypted data packet including the device information frame to obtain a second check code, and writing, by the encryption device 10, the second check code into the device information frame; in step S810, transmitting, by the encryption device 10, the overall encrypted data packet including the device information frame to the upgrade control device 20; in step S820, receiving, by the upgrade control device 20, the overall encrypted data packet including the device information frame; in step S830, checking, by the upgrade control device 20, the overall encrypted data packet including the device information frame to obtain a third check code, and performing, by the upgrade control device 20, an overall decryption on the overall encrypted data packet to obtain an overall data packet in a case that the third check code is consistent with the second check code; in step S840, splitting, by the upgrade control device 20 based on the preset packet length, the overall data packet to obtain the plurality of individually encrypted data packets; in step S850, checking, by the upgrade control device 20, the plurality of individually encrypted data packets to obtain an overall decrypted check code; in step S860, transmitting, by the upgrade control device 20, at least one of the plurality of individually encrypted data packets to the to-be-upgraded device 30 in a case that the overall decrypted check code is consistent with the overall encrypted check code; in step S870, receiving, by the to-be-upgraded device 30, the at least one individually encrypted data packet; in step S880, checking, by the to-be-upgraded device 30, the at least one individually encrypted data packet to obtain at least one individually decrypted check code, and in a case that the at least one individually decrypted check code is consistent with the at least one individually encrypted check code, individually decrypting, by the to-be-upgraded device 30, each of the at least one individually encrypted data packet to obtain at least one data packet; in step S890, in a case that the at least one data packet includes a plurality of data packets, checking, by the to-be-upgraded device 30, the plurality of data packets to obtain a fourth check code, and in a case that the fourth check code is consistent with the first check code, upgrading, by the to-be-upgraded device 30, firmware based on the at least one of the plurality of data packets.

Figure 9:
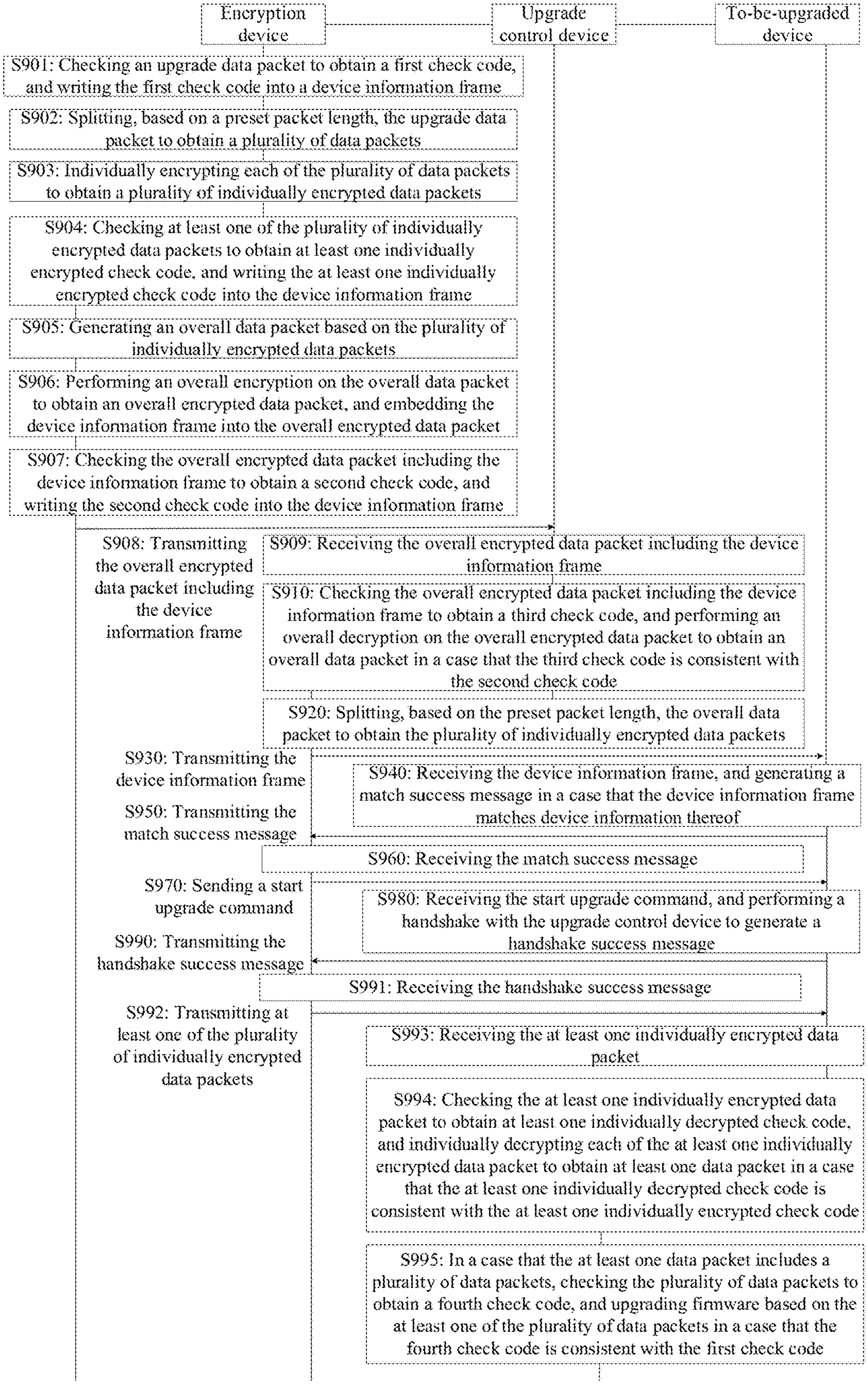
FIG. 9 is an overall flowchart of a method for encrypting an upgrade data packet, a first method for decrypting an upgrade data packet, a second method for decrypting an upgrade data packet, and a method for upgrading firmware according to still another embodiment of the present disclosure.

FIG. 9 is an overall flowchart of a method for encrypting an upgrade data packet, a first method for decrypting an upgrade data packet, a second method for decrypting an upgrade data packet, and a method for upgrading firmware according to still another embodiment of the present disclosure. An encryption device, an upgrade control device, and a to-be-upgraded device in FIG. 9 may respectively correspond to the encryption device 10, the upgrade control device 20, and the to-be-upgraded device 30 in FIG. 1. For the sake of brevity, repetitive descriptions are appropriately omitted.

As shown in FIG. 9, in step S901, checking, by the encryption device 10, an upgrade data packet to obtain a first check code, and writing, by the encryption device 10, the first check code into a device information frame; in step S902, splitting, by the encryption device 10 based on a preset packet length, the upgrade data packet to obtain a plurality of data packets; in step S903, individually encrypting, by the encryption device 10, each of the plurality of data packets to obtain a plurality of individually encrypted data packets; in step S904, checking, by the encryption device 10, at least one of the plurality of individually encrypted data packets to obtain at least one individually encrypted check code, and writing, by the encryption device 10, the at least one individually encrypted check code into the device information frame; in step S905, generating, by the encryption device 10, an overall data packet based on the plurality of individually encrypted data packets; in step S906: performing, by the encryption device 10, an overall encryption on the overall data packet to obtain an overall encrypted data packet, and embedding, by the encryption device 10, the device information frame into the overall encrypted data packet; in step S907, checking, by the encryption device 10, the overall encrypted data packet including the device information frame to obtain a second check code, and writing, by the encryption device 10, the second check code into the device information frame; in step S908, transmitting, by the encryption device 10, the overall encrypted data packet including the device information frame to the upgrade control device 20; in step S909, receiving, by the upgrade control device 20, the overall encrypted data packet including the device information frame; in step S910, checking, by the upgrade control device 20, the overall encrypted data packet including the device information frame to obtain a third check code, and performing, by the upgrade control device 20, an overall decryption on the overall encrypted data packet to obtain an overall data packet in a case that the third check code is consistent with the second check code; in step S920, splitting, by the upgrade control device 20 based on the preset packet length, the overall data packet to obtain the plurality of individually encrypted data packets; in step S930, transmitting, by the upgrade control device 20, the device information frame to the to-be-upgraded device 30; in step S940, receiving, by the to-be-upgraded device 30, the device information frame, and generating, by the to-be-upgraded device 30, a match success message in a case that the device information frame matches device information thereof; in step S950, transmitting, by the to-be-upgraded device 30, the match success message to the upgrade control device 20; in step S960, receiving, by the upgrade control device 20, the match success message; in step S970, sending, by the upgrade control device 20, a start upgrade command to the to-be-upgraded device 30; in step S980, receiving, by the to-be-upgraded device 30, the start upgrade command, and performing, by the to-be-upgraded device 30, a handshake with the upgrade control device 20 to generate a handshake success message; in step S990, transmitting, by the to-be-upgraded device 30, the handshake success message to the upgrade control device 20; in step S991, receiving, by the upgrade control device 20, the handshake success message; in step S992, transmitting, by the upgrade control device 20, at least one of the plurality of individually encrypted data packets to the to-be-upgraded device 30; in step S993, receiving, by the to-be-upgraded device 30, the at least one individually encrypted data packet; in step S994, checking, by the to-be-upgraded device 30, the at least one individually encrypted data packet to obtain at least one individually decrypted check code, and in a case that the at least one individually decrypted check code is consistent with the at least one individually encrypted check code, individually decrypting, by the to-be-upgraded device 30, each of the at least one individually encrypted data packet to obtain at least one data packet; in step S995, in a case that the at least one data packet includes a plurality of data packets, checking, by the to-be-upgraded device 30, the plurality of data packets to obtain a fourth check code, and in a case that the fourth check code is consistent with the first check code, upgrading, by the to-be-upgraded device 30, firmware based on the at least one of the plurality of data packets.

The following describes a specific application scenario of each method in the present disclosure in detail using an example in which the to-be-upgraded device is an internal component of a to-be-upgraded instrument or a device in a local area network. The aforementioned method for encrypting the upgrade data packet, the aforementioned first method for decrypting the upgrade data packet, the aforementioned second method for decrypting the upgrade data packet, and the aforementioned method for upgrading the firmware are applicable to upgrade of the internal component of the to-be-upgraded instrument or the device in the local area network.

As for an upgrade application scenario of the internal component of the to-be-upgraded instrument, an upgrade procedure is as follows.

In a first embodiment, the internal component of one to-be-upgraded instrument may be upgraded.

In a first stage, an upgrade data packet is embedded into a firmware upgrade encryption software tool of an encryption device, the encryption device uses the firmware upgrade encryption software tool to split the upgrade data packet based on a preset packet length, individually encrypt the plurality of split data packets to obtain a plurality of individually encrypted data packets, and perform an overall encryption on an overall data packet generated based on the plurality of individually encrypted data packets to obtain an overall encrypted data packet.

In a second stage, the encryption device embeds a device information frame into the overall encrypted data packet. The overall encrypted data packet embedded with the device information frame is a firmware upgrade data packet.

In a third stage, the firmware upgrade data packet is compressed to obtain a compressed file, and the compressed file is transmitted to an upgrade control device using a storage medium such as a USB flash disk or a cloud platform. The upgrade control device may be a server.

In a fourth stage, the upgrade control device obtains the compressed file, decompresses the compressed file to obtain the firmware upgrade data packet, and obtains the device information frame in the firmware upgrade data packet.

In a fifth stage, the upgrade control device obtains information of the overall encrypted data packet through the device information frame, and performs an overall decryption on the overall encrypted data packet to obtain an overall data packet after the overall decryption. The information of the overall encrypted data packet includes information such as a component model, a firmware version, a hardware version or a firmware length.

In a sixth stage, the upgrade control device checks the overall data packet after the overall decryption, and matches the internal component of the to-be-upgraded instrument with the component model in the device information frame in a case that an obtained check code is consistent with a corresponding check code stored in the device information frame. After the match succeeds, the upgrade control device issues the device information frame, the internal component of the to-be-upgraded instrument determines whether device information (for example, a hardware version) of the internal component is consistent with the device information frame (for example, a hardware version). In a case that the device information (for example, the hardware version) of the internal component is consistent with the device information frame (for example, the hardware version), the internal component of the to-be-upgraded instrument performs a handshake with the upgrade control device. After the handshake succeeds, the upgrade control device transmits the at least one individually encrypted data packet, which is obtained by splitting the overall data packet based on the preset packet length, to the internal component of the to-be-upgraded instrument. The check code obtained by checking the overall data packet after the overall decryption is consistent with the third check code in the aforementioned method for decrypting the upgrade data packet, and the corresponding check code stored in the device information frame is the second check code obtained using the aforementioned method for encrypting the upgrade data packet.

In a seventh stage, each time the internal component of the to-be-upgraded instrument obtains one individually encrypted data packet, the internal component of the to-be-upgraded instrument individually decrypts the one individually encrypted data packet, and stores a data packet after the individual decryption in an internal flash of a preset chip.

In an eighth stage, after all the data packets after the individual decryption are obtained, the internal component of the to-be-upgraded instrument checks all the data packets in the internal flash of the chip. In a case that an obtained check code is consistent with a corresponding check code stored in the device information frame, the internal component of the to-be-upgraded instrument starts its firmware upgrade function, so as to upgrade the internal component. The internal flash of the chip is a non-volatile memory in the chip. The check code obtained by checking all the data packets in the internal flash of the chip is consistent with the fourth check code in the aforementioned method for upgrading the firmware, and the corresponding check code stored in the device information frame is the first check code obtained using the aforementioned method for encrypting the upgrade data packet.

In a second embodiment, a plurality of internal component of the to-be-upgraded instrument may be upgraded.

A first stage to a seventh stage in the second embodiment are the same as the first stage to the seventh stage in the first embodiment, and the first stage to the seventh stage are sequentially executed.

In an eighth stage, the plurality of internal components of the to-be-upgraded instrument sequentially check all the data packets in the internal flash of a corresponding chip, based on a preset sequence. After the check succeeds, the upgrade control device controls a corresponding internal component to be upgraded. After all the internal components are upgraded, the upgrade concludes. It should be understood that the preset sequence may be written in a configuration table in advance, and is transmitted to the to-be-upgraded instrument together with the individually encrypted data packet, enabling the plurality of internal components of the to-be-upgraded instrument to determine a sequence in which the plurality of internal components execute the upgrade.

As for an upgrade application scenario of a local area network device in a same local area network, an upgrade procedure is as follows.

In a first embodiment, one local area network device may be upgraded.

In a first stage, an upgrade data packet is embedded into a firmware upgrade encryption software tool of an encryption device, the encryption device uses the firmware upgrade encryption software tool to split the upgrade data packet based on a preset packet length, individually encrypt the plurality of split data packets to obtain a plurality of individually encrypted data packets, and perform an overall encryption on an overall data packet generated based on the plurality of individually encrypted data packets to obtain an overall encrypted data packet.

In a second stage, the encryption device embeds a device information frame into the overall encrypted data packet. The overall encrypted data packet embedded with the device information frame is a firmware upgrade data packet.

In a third stage, the firmware upgrade data packet is compressed to obtain a compressed file, and the compressed file is transmitted to a to-be-upgraded platform/network central control platform using a storage medium such as a USB flash disk or a cloud platform. The to-be-upgraded platform/network central control platform may be a platform built by a server.

In a fourth stage, the to-be-upgraded platform/network central control platform obtains the compressed file, decompresses the compressed file to obtain the firmware upgrade data packet, and obtains the device information frame in the firmware upgrade data packet.

In a fifth stage, the to-be-upgraded platform/network central control platform obtains information of the overall encrypted data packet through the device information frame, and performs an overall decryption on the overall encrypted data packet to obtain an overall data packet after the overall decryption. The information of the overall encrypted data packet includes information such as a device model, a firmware version, a hardware version or a firmware length.

In a sixth stage, the to-be-upgraded platform/network central control platform checks the overall data packet after the overall decryption, and matches the local area network device with the device model of the device information frame in a case that an obtained check code is consistent with a corresponding check code stored in the device information frame. After the match succeeds, the to-be-upgraded platform/network central control platform issues the device information frame, the local area network device determines whether device information (for example, a hardware version) of the local area network device is consistent with the device information frame (for example, a hardware version). In a case that the device information (for example, the hardware version) of the local area network device is consistent with the device information frame (for example, the hardware version), the local area network device performs a handshake with the to-be-upgraded platform/network central control platform. After the handshake succeeds, the to-be-upgraded platform/network central control platform transmits the at least one individually encrypted data packet, which is obtained by splitting the overall data packet based on the preset packet length, to the local area network device. The check code obtained by checking the overall data packet after the overall decryption is consistent with the third check code in the aforementioned method for decrypting the upgrade data packet, and the corresponding check code stored in the device information frame is the second check code obtained using the aforementioned method for encrypting the upgrade data packet.

In a seventh stage, each time the local area network device obtains one individually encrypted data packet, the local area network device individually decrypts the one individually encrypted data packet, and stores a data packet after the individual decryption in an internal flash of a preset chip.

In an eighth stage, after all the data packets after the individual decryption are obtained, the local area network device checks all the data packets in the internal flash of the chip. In a case that an obtained check code is consistent with a corresponding check code stored in the device information frame, the local area network device starts its firmware upgrade function, so as to upgrade the local area network device. The internal flash of the chip is a non-volatile memory in the chip. The check code obtained by checking all the data packets in the internal flash of the chip is consistent with the fourth check code in the aforementioned method for upgrading the firmware, and the corresponding check code stored in the device information frame is the first check code obtained using the aforementioned method for encrypting the upgrade data packet.

In a second embodiment, a plurality of local area network devices may be upgraded.

A first stage to a seventh stage in the second embodiment are the same as the first stage to the seventh stage in the first embodiment, and the first stage to the seventh stage are sequentially executed.

In an eighth stage, the plurality of local area network devices sequentially check all the data packets in the internal flash of a corresponding chip, based on a preset sequence. After the check succeeds, the to-be-upgraded platform/network central control platform controls a corresponding local area network device to be upgraded. After all the local area network devices are upgraded, the upgrade concludes. It should be understood that the preset sequence may be written in a configuration table in advance, and is transmitted to the plurality of local area network devices together with the individually encrypted data packet, enabling the plurality of local area network devices to determine a sequence in which the plurality of local area network devices execute the upgrade.

Method embodiments of the present disclosure are described in detail above with reference to FIG. 1 to FIG. 9, and apparatus embodiments of the present disclosure are described in detail below with reference to FIG. 10. It should be understood that descriptions of the method embodiments correspond to descriptions of the apparatus embodiments, and therefore, reference may be made to the foregoing method embodiments for parts that are not described in detail.

Figure 10:
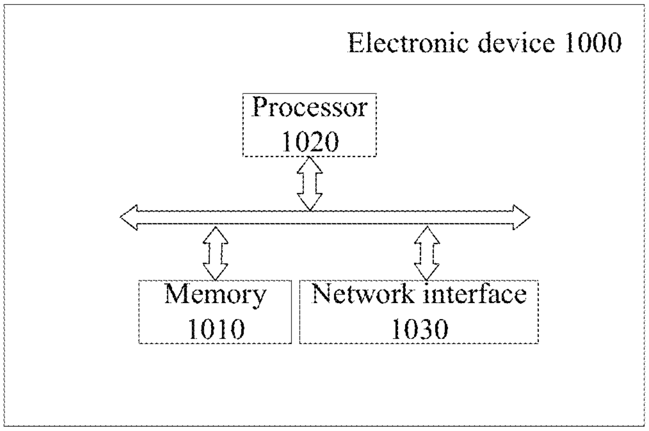
FIG. 10 is a schematic structural diagram of an electronic device according to an embodiment of the present disclosure.

FIG. 10 is a schematic structural diagram of an electronic device according to an embodiment of the present disclosure. The electronic device 1000 may be a mobile terminal or a server. The electronic device 1000 may include a memory 1010 and a processor 1020, and the memory 1010 may be configured to store executable code. The processor 1020 may be configured to execute the executable code stored in the memory 1010 to implement the steps in the methods described above. In some embodiments, the electronic device 1000 may further include a network interface 1030, and a data exchange between the processor 1020 and an external device may be implemented using the network interface 1030.

All or some of the foregoing embodiments may be implemented using software, hardware, firmware, or any combination thereof. When using the software to implement, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or other programmable apparatuses. The computer instruction may be stored in a non-transitory computer-readable storage medium or may be transmitted from one non-transitory computer-readable storage medium to another non-transitory computer-readable storage medium, for example, the computer instruction may be transmitted from a website, a computer, a server, or a data center to another website, another computer, another server, or another data center in wired means (such as a coaxial cable, an optical fiber or a Digital Subscriber Line (DSL)), or in wireless means (such as infrared, radio or microwave). The non-transitory computer-readable storage medium may be any usable medium accessible by a computer, or a data storage device such as a server or a data center, which integrates one or more usable mediums. The usable medium may be a magnetic medium (such as a floppy disk, a hard disk, or a magnetic tape), an optical medium (such as a Digital Video Disk (DVD)), a semiconductor medium (such as a Solid State Disk (SSD)), or the like.

An embodiment of the present disclosure further discloses a non-transitory computer-readable storage medium. The non-transitory computer-readable storage medium stores a computer program, and when the computer program is executed by a processor, the methods in the foregoing embodiments are used.

The computer program may be stored in the non-transitory computer-readable storage medium, and the computer program includes computer program code. The computer program code may be in a form of source code, object code, executable files, certain middleware, or the like. The non-transitory computer-readable storage medium includes any entity or apparatus, a recording medium, a USB flash disk, a removable hard disk, a magnetic disk, an optical disk, a computer memory, a Read-Only Memory (ROM), a Random Access Memory (RAM), an electrical carrier signal, a telecommunication signal, a software distribution medium, or the like, which is capable of carrying the computer program code. It should be noted that the non-transitory computer-readable storage medium includes, but is not limited to, the aforementioned components.

The methods in the foregoing embodiments are stored in the non-transitory computer-readable storage medium, and are loaded and executed on the processor, so as to facilitate storage and application of the foregoing methods.

It should be noted that, in the embodiments of the present disclosure, the method for encrypting the upgrade data packet, the first method for decrypting the upgrade data packet, the second method for decrypting the upgrade data packet, and the method for upgrading the firmware may be individually stored in different non-transitory computer-readable storage mediums, or may all be stored in one non-transitory computer-readable storage medium.

The foregoing descriptions are merely the embodiments of the present disclosure, and are not intended to limit the present disclosure. As for a person skilled in the art, the present disclosure may have various modifications and changes. Any modification, equivalent replacement, improvement, or the like made without departing from the spirit and principle of the present disclosure shall fall within the scope of the claims of the present disclosure.

What is claimed is:

1. A method for encrypting an upgrade data packet, applied to an encryption device, wherein the method for encrypting the upgrade data packet comprises:
   splitting, based on a preset packet length, an upgrade data packet to obtain a plurality of data packets;
   individually encrypting each of the plurality of data packets to obtain a plurality of individually encrypted data packets;
   generating an overall data packet based on the plurality of individually encrypted data packets; and
   performing an overall encryption on the overall data packet to obtain an overall encrypted data packet;
   embedding a device information frame into the overall encrypted data packet, wherein the device information frame comprises the preset packet length; and
   checking the overall encrypted data packet comprising the device information frame to obtain a second check code for enabling an upgrade control device to perform an overall decryption on the overall encrypted data packet; and
   decrypting a received upgrade data packet comprises: receiving at least one individually encrypted data packet transmitted by an upgrade control device; and
   individually decrypting each of the at least one individually encrypted data packet to obtain at least one data packet;
   sending a success to an upgrade control device, wherein when the upgrade control device does not receive the success reply message from a to-be-upgraded device,
   resending, by the upgrade control device, a start upgrade command to the to-be-upgraded device at each preset time interval; and
   in a case that a number of times the start upgrade command is resent reaches a preset threshold number of times, outputting, by the upgrade control device, an alert to a system administrator.

2. The method for encrypting the upgrade data packet according to claim 1, further comprising:
   checking the upgrade data packet to obtain a first check code for enabling a to-be-upgraded device to determine whether to upgrade firmware based on at least one of the plurality of data packets using the first check code.

3. The method for encrypting the upgrade data packet according to claim 1, further comprising:
   checking at least one of the plurality of individually encrypted data packets to obtain at least one individually encrypted check code for enabling a to-be-upgraded device to individually decrypt each of the at least one of the plurality of individually encrypted data packets using the at least one individually encrypted check code.

4. The method for encrypting the upgrade data packet according to claim 1, wherein the device information frame comprises at least one of the following check codes:
   a first check code obtained by checking the upgrade data packet, a second check code obtained by checking the overall encrypted data packet comprising the device information frame, or at least one individually encrypted check code obtained by checking the at least one of the plurality of individually encrypted data packets.

5. A method for decrypting an upgrade data packet, applied to an upgrade control device, wherein the method for decrypting the upgrade data packet comprises:
   performing an overall decryption on an overall encrypted data packet to obtain an overall data packet;
   splitting, based on a preset packet length, the overall data packet to obtain a plurality of individually encrypted data packets; and
   transmitting at least one of the plurality of individually encrypted data packets to a to-be-upgraded device; and
   decrypting a received upgrade data packet comprises: receiving at least one individually encrypted data packet transmitted by an upgrade control device; and
   individually decrypting each of the at least one individually encrypted data packet to obtain at least one data packet;
   sending a success to an upgrade control device, wherein when the upgrade control device does not receive the success reply message from a to-be-upgraded device, resending, by the upgrade control device, a start upgrade command to the to-be-upgraded device at each preset time interval; and
   in a case that a number of times the start upgrade command is resent reaches a preset threshold number of times, outputting, by the upgrade control device, an alert to a system administrator.

6. The method for decrypting the upgrade data packet according to claim 5, wherein the performing the overall decryption on the overall encrypted data packet to obtain the overall data packet comprises:
   checking the overall encrypted data packet comprising a device information frame to obtain a third check code; and
   in a case that the third check code is consistent with a second check code, performing the overall decryption on the overall encrypted data packet to obtain the overall data packet, wherein the device information frame comprises the preset packet length, the device information frame further comprises the second check code, and the second check code is obtained by an encryption device through checking the overall encrypted data packet comprising the device information frame.

7. The method for decrypting the upgrade data packet according to claim 5, further comprising:
   transmitting a device information frame to the to-be-upgraded device for enabling the to-be-upgraded device to generate a match message based on the device information frame and device information of the to-be-upgraded device; and
   in a case that the match message received from the to-be-upgraded device is a match success message, sending a start upgrade command to the to-be-upgraded device for enabling the to-be-upgraded device to determine whether to perform a handshake with the upgrade control device, wherein the transmitting the at least one of the plurality of individually encrypted data packets to the to-be-upgraded device comprises:

in a case that a handshake message received from the to-be-upgraded device is a handshake success message, transmitting the at least one of the plurality of individually encrypted data packets to the to-be-upgraded device.

8. A method for decrypting an upgrade data packet, applied to a to-be-upgraded device, wherein the method for decrypting the upgrade data packet comprises:

receiving at least one individually encrypted data packet transmitted by an upgrade control device; and individually decrypting each of the at least one individually encrypted data packet to obtain at least one data packet; and sending a success to an upgrade control device, wherein when the upgrade control device does not receive the success reply message from a to-be-upgraded device, resending, by the upgrade control device, a start upgrade command to the to-be-upgraded device at each preset time interval; and in a case that a number of times the start upgrade command is resent reaches a preset threshold number of times, outputting, by the upgrade control device, an alert to a system administrator.

9. The method for decrypting the upgrade data packet according to claim 8, wherein the individually decrypting each of the at least one individually encrypted data packet to obtain the at least one data packet comprises:

checking the at least one individually encrypted data packet to obtain at least one individually decrypted check code; and in a case that the at least one individually decrypted check code is consistent with at least one individually encrypted check code, individually decrypting each of the at least one individually encrypted data packet to obtain the at least one data packet, wherein a device information frame corresponding to the at least one individually encrypted data packet comprises the at least one individually encrypted check code, and the at least one individually encrypted check code is obtained by an encryption device through checking the at least one individually encrypted data packet.

10. A method for upgrading firmware, applied to a to-be-upgraded device, wherein the method for upgrading the firmware comprises:

receiving at least one individually encrypted data packet transmitted by an upgrade control device; and individually decrypting each of the at least one individually encrypted data packet to obtain at least one data packet; and sending a success to an upgrade control device, wherein when the upgrade control device does not receive the success reply message from a to-be-upgraded device, resending, by the upgrade control device, a start upgrade command to the to-be-upgraded device at each preset time interval; and and upgrading the firmware based on the at least one data packet;

in a case that a number of times the start upgrade command is resent reaches a preset threshold number of times, outputting, by the upgrade control device, an alert to a system administrator.

11. The method for upgrading the firmware according to claim 10, further comprising:

checking a plurality of data packets to obtain a fourth check code, wherein in a case that the at least one individually encrypted data packet comprises a plurality of individually encrypted data packets, the at least one data packet comprises the plurality of data packets; and the upgrading the firmware based on the at least one data packet comprises:

in a case that the fourth check code is consistent with a first check code, upgrading the firmware based on the at least one of the plurality of data packets, wherein a device information frame corresponding to the plurality of individually encrypted data packets comprises the first check code, and the first check code is obtained by an encryption device through checking an upgrade data packet.

12. An electronic device, comprising a memory and a processor, wherein executable code is stored in the memory, and the processor is configured to execute the executable code to implement the method according to claim 1.

13. An electronic device, comprising a memory and a processor, wherein executable code is stored in the memory, and the processor is configured to execute the executable code to implement the method according to claim 5.

14. An electronic device, comprising a memory and a processor, wherein executable code is stored in the memory, and the processor is configured to execute the executable code to implement the method according to claim 8.

15. An electronic device, comprising a memory and a processor, wherein executable code is stored in the memory, and the processor is configured to execute the executable code to implement the method according to claim 10.

16. A non-transitory computer-readable storage medium, wherein the non-transitory computer-readable storage medium stores a computer program, and the computer program is configured to perform the method according to claim 1.

17. A non-transitory computer-readable storage medium, wherein the non-transitory computer-readable storage medium stores a computer program, and the computer program is configured to perform the method according to claim 5.

18. A non-transitory computer-readable storage medium, wherein the non-transitory computer-readable storage medium stores a computer program, and the computer program is configured to perform the method according to claim 8.

19. A non-transitory computer-readable storage medium, wherein the non-transitory computer-readable storage medium stores a computer program, and the computer program is configured to perform the method according to claim 10.

* * * * *